(12) United States Patent
Bienfait et al.

(10) Patent No.: US 9,258,372 B2
(45) Date of Patent: *Feb. 9, 2016

(54) WIRELESS ROUTER SYSTEM AND METHOD

(75) Inventors: Roberta A. Bienfait, Norcross, GA (US); Mihal Lazaridis, Waterloo, CA (US); Ian M. Patterson, Petersburg, CA (US); Allan D. Lewis, New Dundee, CA (US); Garu P. Mousseau, Waterloo, CA (US); Alan Panezic, Mississauga, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 926 days.

This patent is subject to a terminal disclaimer.

(21) Appl. No.: 13/441,503

(22) Filed: Apr. 6, 2012

(65) Prior Publication Data
US 2012/0201125 A1 Aug. 9, 2012

Related U.S. Application Data

(63) Continuation of application No. 11/947,618, filed on Nov. 29, 2007, now Pat. No. 8,179,872.

(60) Provisional application No. 60/917,003, filed on May 9, 2007.

(51) Int. Cl.
*H04W 4/00* (2009.01)
*H04L 29/08* (2006.01)
(Continued)

(52) U.S. Cl.
CPC .............. *H04L 67/16* (2013.01); *H04W 8/18* (2013.01); *H04L 12/14* (2013.01); *H04L 63/061* (2013.01);
(Continued)

(58) Field of Classification Search
CPC ...... H04L 67/16; H04L 67/2814; H04L 67/34; H04L 51/00; H04L 45/20; H04W 80/06; H04W 88/04; H04W 76/02; H04W 88/182; H04W 28/10; H04W 72/0406; G06F 17/2247; G06Q 10/107; G06Q 10/06
USPC .......... 709/223, 220, 227, 238, 217; 370/338, 370/216, 252, 254, 334, 351; 455/450
See application file for complete search history.

(56) References Cited

U.S. PATENT DOCUMENTS

| | | | |
|---|---|---|---|
| 4,106,060 | A | 8/1978 | Chapman, Jr. |
| 4,417,349 | A | 11/1983 | Hills et al. |

(Continued)

FOREIGN PATENT DOCUMENTS

| | | |
|---|---|---|
| AU | 7843498 | 2/1999 |
| DE | 19961345 | 12/1999 |

(Continued)

OTHER PUBLICATIONS

"Battery Friendly Bulletin," vol. 1, Issue 3, pp. 1-7 and unnumbered page, 1999.

(Continued)

*Primary Examiner* — Alina N Boutah
(74) *Attorney, Agent, or Firm* — Fish & Richardson P.C.

(57) ABSTRACT

A wireless router employing a technique to couple a plurality of host services or host systems and a plurality of wireless networks. A method to route data items between a plurality of mobile devices and a plurality of host systems through a common wireless router. A point-to-point communication connection is preferably established between a first host system and a common wireless router, a mobile network message at a mobile device is generated, the mobile network is transmitted via a wireless network to the common wireless router which in turn routes a data item component of the mobile network message to the appropriate host service.

26 Claims, 17 Drawing Sheets

(51) Int. Cl.

| | |
|---|---|
| *H04W 8/18* | (2009.01) |
| *G06F 15/16* | (2006.01) |
| *H04L 12/14* | (2006.01) |
| *H04L 29/06* | (2006.01) |
| *H04W 8/26* | (2009.01) |
| *H04W 76/02* | (2009.01) |
| *H04W 80/06* | (2009.01) |
| *H04W 88/04* | (2009.01) |
| *H04W 92/24* | (2009.01) |

(52) U.S. Cl.
CPC ............. *H04L 63/166* (2013.01); *H04L 67/26* (2013.01); *H04W 8/26* (2013.01); *H04W 76/02* (2013.01); *H04W 80/06* (2013.01); *H04W 88/04* (2013.01); *H04W 92/24* (2013.01)

(56) References Cited

U.S. PATENT DOCUMENTS

| | | |
|---|---|---|
| 4,438,433 A | 3/1984 | Smoot et al. |
| 4,558,454 A | 12/1985 | Hills et al. |
| 4,644,351 A | 2/1987 | Zabarsky et al. |
| 4,695,880 A | 9/1987 | Johnson et al. |
| 4,697,281 A | 9/1987 | O'Sullivan |
| 4,713,780 A | 12/1987 | Schultz et al. |
| 4,768,087 A | 8/1988 | Taub et al. |
| 4,837,798 A | 6/1989 | Cohen et al. |
| 4,837,800 A | 6/1989 | Freeburg et al. |
| 4,845,658 A | 7/1989 | Gifford |
| 4,856,047 A | 8/1989 | Saunders |
| 4,928,096 A | 5/1990 | Leonardo et al. |
| 4,951,044 A | 8/1990 | Nelson et al. |
| 4,972,457 A | 11/1990 | O'Sullivan |
| 4,980,907 A | 12/1990 | Raith et al. |
| 5,008,926 A | 4/1991 | Misholi |
| 5,043,721 A | 8/1991 | May |
| 5,068,916 A | 11/1991 | Harrison et al. |
| 5,086,502 A | 2/1992 | Malcolm |
| 5,125,021 A | 6/1992 | Lebowitz |
| 5,127,041 A | 6/1992 | O'Sullivan |
| 5,128,981 A | 7/1992 | Tsukamoto et al. |
| 5,136,291 A | 8/1992 | Teague |
| 5,157,660 A | 10/1992 | Kuwahara et al. |
| 5,159,592 A | 10/1992 | Perkins |
| 5,177,680 A | 1/1993 | Tsukino et al. |
| 5,181,200 A | 1/1993 | Harrison |
| 5,210,785 A | 5/1993 | Sato et al. |
| 5,265,033 A | 11/1993 | Vajk et al. |
| 5,283,887 A | 2/1994 | Zachery |
| 5,293,250 A | 3/1994 | Okumura et al. |
| 5,299,255 A | 3/1994 | Iwaki et al. |
| 5,307,059 A | 4/1994 | Connary et al. |
| 5,313,582 A | 5/1994 | Hendel et al. |
| 5,315,635 A | 5/1994 | Kane et al. |
| 5,333,152 A | 7/1994 | Wilber |
| 5,333,266 A | 7/1994 | Boaz et al. |
| 5,370,566 A | 12/1994 | Mitchell, Jr. et al. |
| 5,392,390 A | 2/1995 | Crozier |
| 5,406,557 A | 4/1995 | Baudoin |
| 5,410,543 A | 4/1995 | Seitz et al. |
| 5,416,473 A | 5/1995 | Dulaney, III et al. |
| 5,416,842 A | 5/1995 | Aziz |
| 5,436,960 A | 7/1995 | Campana, Jr. et al. |
| 5,438,611 A | 8/1995 | Campana, Jr. et al. |
| 5,452,356 A | 9/1995 | Albert |
| 5,479,472 A | 12/1995 | Campana, Jr. et al. |
| 5,487,100 A | 1/1996 | Kane |
| 5,493,692 A | 2/1996 | Theimer et al. |
| 5,495,484 A | 2/1996 | Self et al. |
| 5,502,725 A | 3/1996 | Pohjakallio |
| 5,548,789 A | 8/1996 | Nakanura |
| 5,557,659 A | 9/1996 | Hyde-Thomson |
| 5,559,800 A | 9/1996 | Mousseau et al. |
| 5,572,528 A * | 11/1996 | Shuen .................. 370/402 |
| 5,579,472 A | 11/1996 | Keyworth, II et al. |
| 5,588,009 A | 12/1996 | Will |
| 5,598,536 A | 1/1997 | Slaughter, III et al. |
| 5,603,054 A | 2/1997 | Theimer et al. |
| 5,604,491 A | 2/1997 | Coonley et al. |
| 5,604,788 A | 2/1997 | Tett |
| 5,613,108 A | 3/1997 | Morikawa |
| 5,625,670 A | 4/1997 | Campana, Jr. et al. |
| 5,627,829 A | 5/1997 | Gleeson et al. |
| 5,630,060 A | 5/1997 | Tang et al. |
| 5,631,946 A | 5/1997 | Campana, Jr. et al. |
| 5,633,810 A | 5/1997 | Mandal et al. |
| 5,638,450 A | 6/1997 | Robson |
| 5,666,530 A | 9/1997 | Clark et al. |
| 5,666,553 A | 9/1997 | Crozier |
| 5,673,322 A | 9/1997 | Pepe et al. |
| 5,701,423 A | 12/1997 | Crozier |
| 5,705,995 A | 1/1998 | Laflin et al. |
| 5,706,211 A | 1/1998 | Beletic et al. |
| 5,727,202 A | 3/1998 | Kucala |
| 5,729,735 A | 3/1998 | Meyering |
| 5,737,531 A | 4/1998 | Ehley |
| 5,742,905 A | 4/1998 | Pepe et al. |
| 5,745,689 A | 4/1998 | Yeager et al. |
| 5,751,960 A | 5/1998 | Matsunaga |
| 5,751,971 A | 5/1998 | Dobbins et al. |
| 5,754,954 A | 5/1998 | Cannon et al. |
| 5,757,901 A | 5/1998 | Hiroshige |
| 5,758,088 A | 5/1998 | Bexaire et al. |
| 5,758,150 A | 5/1998 | Bell et al. |
| 5,761,416 A | 6/1998 | Mandal et al. |
| 5,764,639 A | 6/1998 | Staples et al. |
| 5,764,899 A | 6/1998 | Eggleston et al. |
| 5,765,170 A | 6/1998 | Morikawa |
| 5,771,353 A | 6/1998 | Eggleston et al. |
| 5,781,614 A | 7/1998 | Brunson |
| 5,781,901 A | 7/1998 | Kuzma |
| 5,790,790 A | 8/1998 | Smith et al. |
| 5,790,974 A | 8/1998 | Tognazzini |
| 5,796,806 A | 8/1998 | Birckbichler |
| 5,812,671 A | 9/1998 | Ross, Jr. |
| 5,812,773 A | 9/1998 | Norin |
| 5,812,819 A | 9/1998 | Rodwin et al. |
| 5,813,016 A | 9/1998 | Sumimoto |
| 5,815,081 A | 9/1998 | Motohashi |
| 5,819,172 A | 10/1998 | Campana, Jr. et al. |
| 5,819,284 A | 10/1998 | Farber et al. |
| 5,822,434 A | 10/1998 | Caronni et al. |
| 5,826,062 A | 10/1998 | Fake, Jr. et al. |
| 5,838,252 A | 11/1998 | Kikinis |
| 5,838,926 A | 11/1998 | Yamagishi |
| 5,844,969 A | 12/1998 | Goldman et al. |
| 5,850,219 A | 12/1998 | Kumomura |
| 5,850,444 A | 12/1998 | Rune |
| 5,862,321 A | 1/1999 | Lamming et al. |
| 5,867,660 A | 2/1999 | Schmidt et al. |
| 5,878,434 A | 3/1999 | Draper et al. |
| 5,881,235 A | 3/1999 | Mills |
| 5,883,890 A | 3/1999 | Okanoue et al. |
| 5,889,845 A | 3/1999 | Staples et al. |
| 5,903,723 A | 5/1999 | Beck et al. |
| 5,905,777 A | 5/1999 | Foladare et al. |
| 5,917,629 A | 6/1999 | Hortensius et al. |
| 5,928,329 A | 7/1999 | Clark et al. |
| 5,937,161 A | 8/1999 | Mulligan et al. |
| 5,941,954 A | 8/1999 | Kalajan |
| 5,941,956 A | 8/1999 | Shirakihara et al. |
| 5,943,426 A | 8/1999 | Frith et al. |
| 5,948,066 A | 9/1999 | Whalen et al. |
| 5,951,636 A | 9/1999 | Zerber |
| 5,953,322 A | 9/1999 | Kimball |
| 5,958,006 A | 9/1999 | Eggleston et al. |
| 5,961,590 A | 10/1999 | Mendez et al. |
| 5,964,833 A | 10/1999 | Kikinis |
| 5,966,663 A | 10/1999 | Gleason |
| 5,968,131 A | 10/1999 | Mendez et al. |
| 5,969,636 A | 10/1999 | Parvulescu et al. |
| 5,973,612 A | 10/1999 | Deo et al. |
| 5,974,180 A | 10/1999 | Schwendeman |

(56) References Cited

U.S. PATENT DOCUMENTS

| | | |
|---|---|---|
| 5,974,238 A | 10/1999 | Chase, Jr. |
| 5,978,689 A | 11/1999 | Tuoriniemi et al. |
| 5,978,837 A | 11/1999 | Foladare et al. |
| 5,983,073 A | 11/1999 | Ditzik |
| 5,987,508 A | 11/1999 | Agraharam et al. |
| 5,995,597 A | 11/1999 | Woltz et al. |
| 6,000,000 A | 12/1999 | Hawkins et al. |
| 6,006,274 A | 12/1999 | Hawkins et al. |
| 6,009,173 A | 12/1999 | Sumner |
| 6,014,429 A | 1/2000 | LaPorta et al. |
| 6,018,762 A | 1/2000 | Brunson et al. |
| 6,023,700 A | 2/2000 | Owens et al. |
| 6,023,708 A | 2/2000 | Mendez et al. |
| 6,034,621 A | 3/2000 | Kaufman |
| 6,035,104 A | 3/2000 | Zahariev |
| 6,052,442 A | 4/2000 | Cooper et al. |
| 6,052,563 A | 4/2000 | Macko |
| 6,052,735 A | 4/2000 | Ulrich et al. |
| 6,055,236 A | 4/2000 | Nessett et al. |
| 6,058,431 A | 5/2000 | Srisuresh et al. |
| 6,067,561 A | 5/2000 | Dillon |
| 6,072,862 A | 6/2000 | Srinivasan |
| 6,073,137 A | 6/2000 | Brown et al. |
| 6,073,165 A | 6/2000 | Narasimhan et al. |
| 6,078,826 A | 6/2000 | Croft et al. |
| 6,084,969 A | 7/2000 | Wright et al. |
| 6,085,192 A | 7/2000 | Mendez et al. |
| 6,085,231 A | 7/2000 | Agraharam et al. |
| 6,085,232 A | 7/2000 | Kikinis |
| 6,091,951 A | 7/2000 | Sturniolo et al. |
| 6,092,114 A | 7/2000 | Shaffer et al. |
| 6,092,191 A | 7/2000 | Shimbo et al. |
| 6,101,531 A | 8/2000 | Eggleston et al. |
| 6,112,244 A | 8/2000 | Moore et al. |
| 6,115,394 A | 9/2000 | Balachandran et al. |
| 6,115,736 A | 9/2000 | Devarakonda et al. |
| 6,119,167 A | 9/2000 | Boyle et al. |
| 6,125,281 A | 9/2000 | Wells et al. |
| 6,125,369 A | 9/2000 | Wu et al. |
| 6,128,739 A | 10/2000 | Fleming, III |
| 6,130,892 A | 10/2000 | Short et al. |
| 6,131,096 A | 10/2000 | Ng et al. |
| 6,131,116 A | 10/2000 | Riggins et al. |
| 6,134,432 A | 10/2000 | Holmes et al. |
| 6,138,146 A | 10/2000 | Moon et al. |
| 6,141,690 A | 10/2000 | Weiman |
| 6,144,671 A | 11/2000 | Perinpanathan et al. |
| 6,144,997 A | 11/2000 | Lamming et al. |
| 6,151,498 A | 11/2000 | Roel-Ng et al. |
| 6,151,606 A | 11/2000 | Mendez |
| 6,154,839 A | 11/2000 | Arrow et al. |
| 6,157,318 A | 12/2000 | Minata |
| 6,157,630 A | 12/2000 | Adler et al. |
| 6,157,950 A | 12/2000 | Krishnan |
| 6,163,274 A | 12/2000 | Lindgren |
| 6,167,379 A | 12/2000 | Dean et al. |
| 6,170,057 B1 | 1/2001 | Inoue et al. |
| 6,178,331 B1 | 1/2001 | Holmes et al. |
| 6,185,603 B1 | 2/2001 | Henderson et al. |
| 6,219,694 B1 | 4/2001 | Lazaridis et al. |
| 6,233,341 B1 | 5/2001 | Riggins |
| 6,240,088 B1 | 5/2001 | Gayton et al. |
| 6,249,820 B1 | 6/2001 | Dobbins et al. |
| 6,256,666 B1 | 7/2001 | Singhal |
| 6,272,545 B1 | 8/2001 | Flanagin et al. |
| 6,275,848 B1 | 8/2001 | Arnold |
| 6,275,850 B1 | 8/2001 | Beyda et al. |
| 6,289,212 B1 | 9/2001 | Stein et al. |
| 6,292,668 B1 | 9/2001 | Alanara et al. |
| 6,311,282 B1 | 10/2001 | Nelson et al. |
| 6,314,108 B1 | 11/2001 | Ramasubramani et al. |
| 6,314,519 B1 | 11/2001 | Davis et al. |
| 6,324,544 B1 | 11/2001 | Alam et al. |
| 6,324,587 B1 | 11/2001 | Trenbeath et al. |
| 6,330,244 B1 | 12/2001 | Swartz et al. |
| 6,333,973 B1 | 12/2001 | Smith et al. |
| 6,356,956 B1 | 3/2002 | Deo et al. |
| 6,360,272 B1 | 3/2002 | Lincke et al. |
| 6,389,455 B1 | 5/2002 | Fuisz |
| 6,389,457 B2 | 5/2002 | Lazaridis et al. |
| 6,400,958 B1 | 6/2002 | Isomursu et al. |
| 6,401,113 B2 | 6/2002 | Lazaridis et al. |
| 6,415,331 B1 | 7/2002 | Ariga |
| 6,438,585 B2 | 8/2002 | Mousseau et al. |
| 6,449,287 B1 | 9/2002 | Leuca et al. |
| 6,463,463 B1 | 10/2002 | Godfrey et al. |
| 6,463,464 B1 | 10/2002 | Lazaridis et al. |
| 6,470,358 B1 | 10/2002 | Beyda et al. |
| 6,487,560 B1 | 11/2002 | LaRue et al. |
| 6,496,496 B1 | 12/2002 | Ramakrishna et al. |
| 6,507,589 B1* | 1/2003 | Ramasubramani et al. .. 370/465 |
| 6,701,378 B1 | 3/2004 | Gilhuly et al. |
| 6,771,609 B1 | 8/2004 | Gudat et al. |
| 6,801,941 B1 | 10/2004 | Stephens et al. |
| 6,804,720 B1 | 10/2004 | Vilander et al. |
| 6,819,670 B1 | 11/2004 | Fenner |
| 6,845,094 B1 | 1/2005 | Zhang |
| 6,895,234 B1 | 5/2005 | Laursen et al. |
| 6,912,232 B1* | 6/2005 | Duffield et al. ............... 370/468 |
| 6,963,555 B1 | 11/2005 | Brenner et al. |
| 6,976,087 B1* | 12/2005 | Westfall et al. ............... 709/238 |
| 7,010,303 B2* | 3/2006 | Lewis et al. ................... 455/445 |
| 7,065,588 B2* | 6/2006 | Konda et al. .................. 709/246 |
| 7,069,332 B2* | 6/2006 | Shibata et al. ................ 709/231 |
| 7,145,898 B1 | 12/2006 | Elliott |
| 7,180,887 B1* | 2/2007 | Schwaderer et al. ......... 370/351 |
| 7,184,418 B1 | 2/2007 | Baba et al. |
| 7,197,556 B1 | 3/2007 | Short et al. |
| 7,392,049 B2 | 6/2008 | Rajkotia et al. |
| 7,453,850 B2 | 11/2008 | Yang et al. |
| 7,529,230 B2 | 5/2009 | Lewis et al. |
| 7,860,943 B2* | 12/2010 | Kim et al. ..................... 709/217 |
| 8,045,567 B2 | 10/2011 | Chava et al. |
| 8,050,684 B2 | 11/2011 | Lewis et al. |
| 8,102,775 B2* | 1/2012 | Thubert ........................ 370/238 |
| 8,165,575 B2 | 4/2012 | Lewis et al. |
| 8,179,872 B2* | 5/2012 | Bienfait et al. ............... 370/338 |
| 8,483,694 B2 | 7/2013 | Lewis et al. |
| 8,693,996 B2 | 4/2014 | Lewis et al. |
| 2001/0001552 A1 | 5/2001 | Vong et al. |
| 2001/0015977 A1 | 8/2001 | Johansson |
| 2001/0025256 A1 | 9/2001 | Oliphant et al. |
| 2001/0029531 A1 | 10/2001 | Ohta |
| 2001/0029547 A1* | 10/2001 | Kano et al. ................... 709/238 |
| 2001/0040693 A1 | 11/2001 | Saito et al. |
| 2001/0042093 A1 | 11/2001 | Shirai et al. |
| 2001/0045885 A1 | 11/2001 | Teti |
| 2001/0054072 A1 | 12/2001 | Discolo et al. |
| 2002/0013902 A1 | 1/2002 | Youstra |
| 2002/0026517 A1 | 2/2002 | Watson |
| 2002/0031107 A1 | 3/2002 | Li et al. |
| 2002/0049054 A1 | 4/2002 | O'Connor et al. |
| 2002/0059380 A1 | 5/2002 | Biliris et al. |
| 2002/0062388 A1 | 5/2002 | Ogier et al. |
| 2002/0112014 A1 | 8/2002 | Bennett et al. |
| 2002/0122394 A1* | 9/2002 | Whitmore et al. ............ 370/328 |
| 2002/0196793 A1 | 12/2002 | Samba et al. |
| 2003/0026231 A1 | 2/2003 | Lazaridis et al. |
| 2003/0043783 A1 | 3/2003 | Spencer |
| 2003/0228868 A1 | 12/2003 | Turanyl et al. |
| 2003/0235175 A1* | 12/2003 | Naghian et al. .............. 370/338 |
| 2004/0116119 A1* | 6/2004 | Lewis et al. ................ 455/435.1 |
| 2004/0184420 A1 | 9/2004 | Xu et al. |
| 2004/0233855 A1* | 11/2004 | Gutierrez et al. ............. 370/252 |
| 2004/0242154 A1* | 12/2004 | Takeda et al. ................... 455/16 |
| 2004/0258063 A1 | 12/2004 | Raith et al. |
| 2004/0264505 A1 | 12/2004 | Miki et al. |
| 2005/0135311 A1* | 6/2005 | Maillard ........................ 370/331 |
| 2005/0261012 A1 | 11/2005 | Weiser |
| 2006/0050692 A1* | 3/2006 | Petrescu et al. ............... 370/389 |
| 2007/0106740 A1* | 5/2007 | Yach et al. .................... 709/206 |
| 2007/0127503 A1* | 6/2007 | Zhao ............................. 370/400 |
| 2007/0153685 A1 | 7/2007 | Moon et al. |
| 2007/0153702 A1* | 7/2007 | Khan Alicherry et al. ... 370/252 |

(56) References Cited

U.S. PATENT DOCUMENTS

| | | | |
|---|---|---|---|
| 2007/0248052 A1 | 10/2007 | Nagaraj | |
| 2007/0297388 A1* | 12/2007 | Appaji et al. | 370/351 |
| 2008/0002640 A1 | 1/2008 | Westphal | |
| 2008/0025270 A1* | 1/2008 | Moon | 370/338 |
| 2008/0107172 A1 | 5/2008 | Kwak | |
| 2008/0108343 A1 | 5/2008 | Kwak | |
| 2008/0228940 A1* | 9/2008 | Thubert | 709/238 |
| 2008/0253340 A1* | 10/2008 | Hirano et al. | 370/338 |
| 2009/0135765 A1 | 5/2009 | Lewis et al. | |
| 2010/0036662 A1 | 2/2010 | Emmons | |
| 2010/0107169 A1 | 4/2010 | Watanabe | |
| 2010/0261502 A1 | 10/2010 | Martin-Cocher et al. | |
| 2010/0290419 A1 | 11/2010 | Wengerter | |

FOREIGN PATENT DOCUMENTS

| | | |
|---|---|---|
| EP | 0617373 | 9/1994 |
| EP | 0736989 | 10/1996 |
| EP | 0760503 A1 | 3/1997 |
| EP | 0772327 | 5/1997 |
| EP | 0777394 | 6/1997 |
| EP | 0788287 | 8/1997 |
| EP | 0793387 | 9/1997 |
| EP | 0825788 | 2/1998 |
| EP | 0838774 | 4/1998 |
| EP | 0838934 | 4/1998 |
| EP | 0892576 | 1/1999 |
| EP | 0918417 | 5/1999 |
| EP | 0930766 | 7/1999 |
| EP | 0986225 | 3/2000 |
| EP | 1022881 | 7/2000 |
| EP | 1096725 | 5/2001 |
| JP | 9214556 | 8/1997 |
| JP | 9305155 | 11/1997 |
| JP | 11289346 | 10/1999 |
| WO | 96/19064 | 6/1996 |
| WO | 97/26709 | 7/1997 |
| WO | 97/27717 | 7/1997 |
| WO | 97/32251 | 9/1997 |
| WO | 97/33421 | 9/1997 |
| WO | 97/41654 | 11/1997 |
| WO | 97/44942 | 11/1997 |
| WO | 97/49251 | 12/1997 |
| WO | 98/00787 | 1/1998 |
| WO | 98/21911 | 5/1998 |
| WO | 98/23108 | 5/1998 |
| WO | 98/26344 | 6/1998 |
| WO | 98/40988 | 9/1998 |
| WO | 98/48560 | 10/1998 |
| WO | 99/05620 | 2/1999 |
| WO | 99/05813 | 2/1999 |
| WO | 99/06900 | 2/1999 |
| WO | 99/12365 | 3/1999 |
| WO | 99/17505 | 4/1999 |
| WO | 99/19988 | 4/1999 |
| WO | 99/36870 | 7/1999 |
| WO | 99/45484 | 9/1999 |
| WO | 99/45684 | 9/1999 |
| WO | 99/48312 | 9/1999 |
| WO | 99/50974 | 10/1999 |
| WO | 99/63709 | 12/1999 |
| WO | 00/11567 | 3/2000 |
| WO | 00/11832 | 3/2000 |
| WO | 00/20994 | 4/2000 |
| WO | 00/31931 | 6/2000 |
| WO | 00/41359 | 7/2000 |
| WO | 00/78008 | 12/2000 |
| WO | 01/13572 | 2/2001 |
| WO | 01/13656 | 2/2001 |
| WO | 01/22669 | 3/2001 |
| WO | 01/41472 | 6/2001 |
| WO | 01/67716 | 9/2001 |
| WO | 01/71539 | 9/2001 |

OTHER PUBLICATIONS

"BlackBerry Technical White Paper," Research in Motion Ltd., Version 1.0, 1998-1999.
"FLEXTM Technology Timeline," Accessed online Jun. 1, 2001, (3 pps.).
"Mobile Vision Direct Wireless Connection to Your LAN-Based Electronic Mailbox," CE Software, Inc., pp. 1-21, 1995.
"Motorola's 'Marco' Wireless Communicator," http://www.msu.edu/-luckie/gallery/marco.htm, Aug. 6, 2001 (2 pps.).
"Motorola's 'Marco' Wireless Communicator," http://www.msu.edu/-luckie/gallery/marco.htm, Jun. 14, 2001 (3 pps.).
Arnum, "The Universal Mailbox Arrives . . . Sort of," Business Communications Review, pp. 49-52 (May 1996).
Behr, "Handheld Solutions", Informationweek, pp. 106-113, Oct. 27, 1997.
Binder, et al., "The Alohanet Menehune," University of Hawaii, Version II, Sep. 1974, 114 pages.
Black, et al., "Personal Digital Assistants," Macworld Reviews, Aug. 6, 2001, 5 pages.
BlackBerry Technical White Paper, Research in Motion Ltd., Version 1.0, 1998-1999, 17 pages.
Briere, et al., "One Mailbox, Just Like Old Times," Network World, vol. 14, issue 16, p. 21, Apr. 21, 1997.
Cheshire and Baker., "Internet Mobility 4 X 4," Computer Science Department, Stanford University, pp. 1-12, Aug. 1996.
Claxton, "Messaging API's for Voice Networks," Telecommunications, pp. 116-120, Apr. 1, 1998.
Comerford, "Handhelds Duke It Out for the Internet," Wireless Internet, pp. 35-38 and 41, Aug. 2000.
Compaq, Aero 2100 Series Color Palm-size PC Reference Guide, Second Edition, Aug. 1999, Compaq Corporation.
Computer Structures-Principles and Examples, McGraw Hill (1982).
Dawson, et al., "iCalendar Message-Based Interoperability Protocol (iMIP)," Standards Track, RFC 2447, iMIP, Nov. 1998, 4 pp., XP-002249002.
Declaration of David A. Keeney regarding SAM System, Sep. 3, 2002, pp. 1-33.
Dewey, Barney, "Communications Strategies for Newton 2.0," Newton Technology Journal, p. 10, Jun. 1996.
DTS Wireless Website located at http://www.dtswireless.com.
Egevang, K. et al., "The IP Network Address Translator," Network Working Group, pp. 1-10, May 1994.
Enterprise Solutions for Email Overload, Founder Publications, http://www.amikanow.com/corporte/publications.htm, 9 pages, Aug. 6, 2001.
Feibus, "A Desktop in Your Palm," Informationweek, Aug. 25, 1997, pp. 65-78.
Frezza, "PDA, PDA, Wherefore Art Thou, PDA?", Freewire, Aug. 6, 2001, 7 pages.
Gadol, et al. "Nomadic Tenets-A User's Perspective," Sun Microsystems Laboratories, Inc., pp. 1- 16, Jun. 1994.
General Magic, Inc., Corporate Backgrounder, 2001 (2 pps.).
Gifford, et al., "An Architecture for Large Scale Information Systems," ACM, pp. 161-170, 1985.
Gifford, et al., "The Application of Digital Broadcast Communication to Large Scale Information Systems," IEEE Journal on Selected Areas in Communications, vol. SAC-3, No. 3, pp. 457-467 (May 1985).
Goldszmidt, Gennan et al., "ShockAbsorber: A TCP Connection Router," Globecom 97, IEEE Global Telecommunications Conference, Nov. 3-8, 1997, pp. 1919-1923.
Hawaleshka, "The Web in Your Pocket," Maclean's, May 15, 2000 (3 pps.).
IBM Portable Terminal User's Guide, Third Edition, Jun. 1985, 278 pages.
Information Display Pager D40, NEC Corporation, 7 pages, undated.
Inouye, et al. "System Support for Mobile Multimedia Applications," Proceedings of the IEEE 7, International Workshop on Network and Operating System Support for Digital Audio and Video, May 19-21, 1997, pp. 135-146.

(56) References Cited

OTHER PUBLICATIONS

Johnson, "Mobile Host Internetworking Using IP Loose Source Routing," School of Computer Science, Carnegie Mellon University, pp. 1-14, Feb. 1993.
Johnson, "Scalable and Robust Internetwork Routing for Mobile Hosts," IEEE Computer Society, pp. 2-11, Jun. 21-24, 1994.
Johnson, "Ubiquitous Mobile Host Internetworking," Fourth Workshop on Workstation Operating Systems, pps. 85-90, Oct. 14-15, 1993.
Johnson., "Scalable Support for Transparent Mobile Host lnternetworking," Wireless Networks, The Journal of Mobile Communication, Computation and Information, vol. 1, No. 3, Oct. 1995, pp. 311-321.
Kramer, "Wireless E-Mail Services Gain Windows Clients," Apr. 17, 1995.
Krebs, "Portable Computer and Host Talk Over Radio-Frequency Link," Electronic, pp. 142-145, Aug. 25, 1983.
Kuehn, Carl, "More than EMail," Southwest Computer & Business Equipment Review, vol. VII, No. 2, (Feb. 1990) (2 pages).
Lavana, et al., "Internet-Based Workflows: A Paradigm for Dynamically Reconfigurable Desktop Environments," Conference on Supporting Group Work, Proceedings of the International ACM SIG-GROUP Conference on Supporting Group Work: The lnteQration Challenge, PQS. 204-213, Nov. 16-19, 1997.
Lynch, "Real World Computing," PC Pro Issue 31, Jul. 30, 1997, 7 pages.
Mobile Vision Direct Wireless Connection to Your LAN-Based Electronic Mailbox User Manual, CE Software, Inc., 1995, 50 pages.
Moody's Investors Service, Socket Communications Inc.—History & Debit, lnvestex Report No. 3240276, Feb. 28, 1998, 5 pages.
Mosher, Microsoft Exchange User's Handbook, Duke Press, 1997, pp. 547-549.
Motorola Operating Instructions for Your "PMR 2000" Series Display Radio Pagers Personal Message Center , 7 pages, 2000.
Motorola PMR 2000 Personal Message Receiver POCSAG (CCIR Radio Paging Code #1), 6 pages, 1986.
Motorola, "AirMobile™ Wireless Comm Guide for cc: Mail" User Guide version 1.0, Motorola Wireless Data Group, 1995, pp. 3-48.
Motorola, Inc., emailVClient, 2001 (4 pages).
Nelson, "Wireless Data Services: Here and Now," PDA Developers 2.6, Nov./Dec. 1994, 3 pages.
News Release, "CE Software Announces Mobile Vision," Editorial Contacts, CE Software, Inc., Jan. 4, 1995 (3 pps.).
News Release, "CE Software Ships Mobile Vision," Jun. 20, 1995 (3 pps.).
News Release, "Motorola Announces Pagewriter 250, The World's Smallest Pager with Full Keyboard", Feb. 27, 1997 (2 pps.).
News Release, "Motorola Rings in 1995 with the Launch of MacroR Wireless Communicator," Jan. 4, 1995, 4 pages.
Newsletter, E-Mail Merges With Voice Through Infinite Technologies, Voice Technology & Services News, May 26, 1998.
Newsletter, VODAPAGE: Vodapage demos increasing convergence of pagers and mobile communications at TMA 29, M2 Presswire, No. 28, 1996.
Newton Reference, Communications, 1996-1997 (4 pps.).
Padwick, et al., Special Edition Using Microsoft Outlook 97, Que Corporation, pp. 250-251, 353-367, 1997.
Pegasus Email Settings, ABSnet Internet Services, Inc., Jun. 27, 2001, 4 pages.
Perkins, "RFC 2002—IP Mobility Support," IBM, Oct. 1996, 61 pages.
Perkins, Charles E. et al., "Mobility Support in IPv6," International Conference on Mobile Computing and Networking, Proceedings of the Second Annual International Conference on Mobile Computing and Networking, Nov. 11-12, 1996, pp. 27-37.
Perkins, et al., "IMHP: A Mobile Host Protocol for the Internet," Computer Networks and ISDN Systems 27 (1994). pp. 479-491.
Press Detail, "3Com Corporation Licenses Bluetooth Technology from Extended Systems," Feb. 22, 2000 (2 pps.).
Press Detail, "Extended Systems and Motorola Bring Short-Range Wireless to the Paging E-volution," Jan. 13, 2000 (3 pps.).
Press Release, "Apple Agrees to License Newton Technology to Schlumberger, Digital Ocean," Nov. 3, 1995 (3 pps.).
Press Release, "Motorola Announces New Solutions to Provide Consumers with Wireless Access to Personal and Enterprise E-mail Accounts," Mar. 21, 2001 (4 pps.).
Reiter, "Focus on Technology," Telocator, Jan. 1990, 4 pages.
Roubelat, "Server and BBS Software for the Packet Radio" Feb. 6, 1993 (pp. 1-173).
SAM integrates E-mail, Alpha Paging, Fax, and more!, SAM System for Automated Messages, 1989 (10 pages).
SAM System for Automated Messages Reference Manual, Sep. 1989, 182 pages.
SAM System for Automated Messages User's Manual, 1988, 17 pages.
SAMpage Manual, version 2.0, TecNow!, Feb. 1990, 62 pages.
Schoettle, Bob, "IP-Address Management on LANs," Byte, pps. 199-200, Feb. 1996.
Spooner, "3Com PalmPilot Gets Wireless Link for E-Mail," PC Week, Dec. 8, 1997.
Sullivan, "Have Your Pager Call My Pager," Sullivan, Kristina B., PC Week, Dec. 8, 1997.
Sun Microsystems, JavaMail API Design Specification, Version 1.0, Dec. 9, 1997, Sun Microsystems, Inc., chapters 1-10 appendices A-E.
Takahashi et al., "Communication Method with Data Compression and Encryption for Mobile Computing Environment," Proceedings of INET96, Montreal, Canada, Jun. 24-28, 1996, Transforming Our Society Now, 11 pages.
Taylor et al., "Internetwork Mobility the CDPD Approach," Jun. 11, 1996, 322 pages.
United States District Court, Northern District of California, San Francisco Division: *Good Technology, Inc.* v. *Research in Motion, Ltd.*, et al., Case No. CO2-2348 MJJ, Plaintiff Good Technology, lnc.'s Preliminary Invalidity Contentions Pursuant to Patent L.R. 3-3 and Response Under Patent L.R. 3-4, Jan. 16, 2004, 42 pages.
Xu, "Reliable Stream Transmission Protocols in Mobile Computing Environments," Bell Labs Technical Journal, Summer 1997, pp. 152-163.
Yeom, et al., "IP Multiplexing by Transparent Port-Address Translator," Proceedings of the Tenth USENIX System Administration Conference, pp. 113-122, Sep. 29-Oct. 4, 1996.
Canadian Office Action in Canadian Application No. 2,725,700, dated Dec. 13, 2013, 2 pages.
EP Communication in European Application No. 01271927.4 dated Mar. 2, 2006, 6 pages.
EP Communication in European Application No. 01271927.4 dated Oct. 13, 2008, 5 pages.
EP Communication in European Application No. 01271927.4 dated Sep. 6, 2007, 4 pages.
EP Communication in European Application No. 01271927.4 dated Sep. 7, 2009, 4 pages.
International Preliminary Examination Report for related Application PCT/CA01/01814 dated Aug. 12, 2003 (12 pages).
International Preliminary Report on Patentability and Written Opinion in Internatinal Patent Application No. PCT/US2008/062761, completed on Sep. 9, 2009, 14 pages.
International Search Report in International Patent Application No. PCT/CA01/01814, mailed on Jan. 17, 2003, 5 pages.
Notice of Allowance in U.S. Appl. No. 13/228,849, dated Apr. 18, 2013, 9 pages.
Notice of Allowance in U.S. Appl. No. 10/451,717, dated Jul. 13, 2005, 7 pages.
Notice of Allowance in U.S. Appl. No. 11/210,718, dated Feb. 13, 2009, 7 pages.
Notice of Allowance in U.S. Appl. No. 12/357,861 dated Aug. 22, 2011, 8 pages.
Notice of Allowance in U.S. Appl. No. 13/111,465, dated Feb. 3, 2012, 9 pages.
Office Action in U.S. Appl. No. 11/210,718, dated Aug. 26, 2008, 12 pages.
Office Action in U.S. Appl. No. 12/357,861, dated Apr. 20, 2011, 9 pages.

(56) References Cited

OTHER PUBLICATIONS

Office Action in U.S. Appl. No. 12/357,861, dated Jan. 21, 2011, 9 pages.
Office Action in U.S. Appl. No. 13/228,849, dated Jan. 15, 2013, 6 pages.
Braden ISI D Clark MIT Laboratory for Computer Science S Crocker Trusted Information Systems R et al: "Report of IAB Workshop on Security in the Internet Architecture; rfc1636.txt," IETF Standard, Internet Engineering Task Force, IETF, CH, Jun. 1, 1994, XP015007423.
Shenoy G et al: "HydraNet-FT: network support for dependable services," Distributed Computing Systems, 2000. Proceedings. 20th International Conference on Taipei, Taiwan Apr. 10-13, 2000, Los Alamitos, CA, USA, IEEE Comput. Soc, US, Apr. 10, 2000, pp. 699-706, XP010379084.

* cited by examiner

WIRELESS ROUTER SYSTEM AND METHOD

CROSS REFERENCE TO RELATED APPLICATIONS

This is a continuation of application Ser. No. 11/947,618, filed Nov. 19, 2007, which claims the priority of Provisional Application No. 60/917,003, filed on May 9, 2007, the contents of which are incorporated herein by reference.

The present invention is related to a wireless routing system and method for exchanging data items between one or more host services and a plurality of mobile devices.

BACKGROUND OF THE INVENTION

To get around the problem of pushing information to a mobile device most system today either use a pull paradigm to get information to the mobile device, or they warehouse information until the handheld device plugs into a serial port to download the bulk information. Those systems that do exist for wireless networks are generally gateway's and proxy servers. Gateway systems generally act to accept wireless handheld requests and perform synchronization and transport functions to ensure the information is delivered using a pull paradigm. Proxy servers work at either the transport or application level to spoof protocols into believing everything is working successfully.

The need to continuously push information to a handheld device is still present in the wireless industry today. Instead of warehousing (or storing) the user's data items at the host system and then "synchronizing" the mobile data communication device to data items stored at the host system when the mobile device requests that such items of information be communicated to it, the present invention allows advanced applications to implement a "push" paradigm that continuously packages and retransmits the user-selected items of information to the mobile device through a routing system. Wireless mobile data communications devices, especially those that can return a confirmation signal to the host that the pushed data has been received are especially well suited for this type of push paradigm.

In the router paradigm, attempts to address simple connectivity to one or more wireless networks have not developed a commercially feasible wireless router capable of supporting push to a community of host services and mobile devices. This problem is difficult and requires a specialized solution given the anomalies found in wireless data networks. Instead, these infrastructure manufacturers are building internal network switches for the wireless networks, which simply solve the problem of moving data from A to B, with no concern about ensuring end-to-end delivery of datagrams and providing push services that can abstract away network issues. The problem of guaranteed end-to-end delivery are more complex and require a specialized wireless router to be developed.

Those present systems and methods for replicating information from a host system to a user's mobile data communication device are typically "synchronization" systems in which the user's data items are warehoused or stored at the host system for an indefinite period of time and then transmitted in bulk only in response to a user request. In these types of systems and methods, when replication of the warehoused data items to the mobile device is desired, the user typically places the mobile device in an interface cradle that is electrically connected to the host system via some form of local, dedicated communication, such as a serial cable or an infrared or other type of wireless link. Software executing on the mobile data communication device then transmits commands via the local communications link to the host system to cause the host to begin transmitting the user's data items for storage in a memory bank of the mobile device. In these synchronization schemes, the mobile unit "pulls" the warehoused information from the host system in a batch each time the user desires to replicate information between the two devices. Therefore, the two systems (host and mobile) only maintain the same data items after a user-initiated command sequence that causes the mobile device to download the data items from the host system. A general problem with these synchronization systems is that the only time that the user data items are replicated between the host system and the mobile data communication device is when the user commands the mobile device to download or pull the user data from the host system. Shortly thereafter a new message could be sent to the user, but the user would not receive that message until the next time the user fetches the user data items. Thus, a user may fail to respond to an emergency update or message because the user only periodically synchronizes the system, such as once per day. Other problems with these systems include: (1) the amount of data to be reconciled between the host and the mobile device can become large if the user does not "synchronize" on a daily or hourly basis, leading to bandwidth difficulties, particularly when the mobile device is communicating via a wireless packet-switched network; and (2) reconciling large amounts of data, as can accrue in these batch-mode synchronization systems, can require a great deal of communication between the host and the mobile device, thus leading to a more complex, costly and energy-inefficient system. A more automated, continuous, efficient and reliable system of ensuring that user data items are replicated at the user's mobile device is therefore needed.

There remains a general need for a routing system and method through which such user-selected data items or portions thereof can be pushed from a host system to a mobile data communication device, to thereby provide for "always on, always connected" functionality of the mobile device and mirroring of host system data items at the mobile device.

There remains an additional need for such a system and method that provides flexibility in the types and quantities of user data items that are pushed from the host system to the mobile data communication device and that also provides flexibility in the configuration and types of events that can serve to trigger the redirection of the user data items.

There is a related need for a transparent routing system and method that provides end-to-end security for user-selected data items pushed from a host system to a mobile communication device. Particularly where the host system is located behind a firewall, there is a need for a secure routing system and method that effectively extends the firewall to the mobile device.

A further need remains for a single routing system and associated method that can push data items from a sending host system on any of a plurality of communication networks to a destination mobile device on any of a further plurality of similar or dissimilar wireless data communication networks located anywhere in the world.

A further need remains for a routing system that supports push messaging that provides protection to the mobile device for unwanted information. The concept of an individualized firewall agent will be disclosed that gives control to the owner and user of the mobile device to stop unwanted services from sending junk mail, or denial-of-service attacks at the mobile device.

There remains an additional need for such a system and method that provides flexibility in the types and quantities of user data items that are pushed from the host system to the mobile data communication device.

SUMMARY OF THE INVENTION

The present invention overcomes the problems noted above and satisfies the needs in this field for a system and method of routing pushed data items from a host system to a user's mobile device. A further aspect of the invention relates to a system and method for routing information or data items to and from the mobile device. Information destined for or sent from the mobile device is routed through a routing system in accordance with an associated routing method. The routing device and method provide an interface between multiple wireless communication devices on the same wireless communication network, between multiple wireless communication networks, or between a wireless communication network and one or more wired landline networks. The routing system and method also provide for pushing of data items to the mobile communication device, facilitating "always on, always connected" functionality of the mobile device.

As used in this application the term host system can refer to one or more computer systems linked via a local area network (LAN), a wide area network (WAN) or some virtual private network (VPN) arrangement. The host system is combined through a common association, like a corporate enterprise computer system, an Internet Service Provider (ISP) or an value-added Internet Service like AOL. On the host system, there can be one or more host services operating. Any one of these host services might offer wireless access through the wireless router being disclosed in this application. Host services could be e-mail, calendar, and web page access or more complicated financial host services, stock trading host services or database access host services. The host service may or may not employ a 'push method' to enhance the mobile experience for the user. Host software programs to can run in a corporate environment, in an ISP (Internet Service Provider) environment, in an ASP (Application Service Provider) environment, or many other environments as long as Internet connectivity is available. In accordance with an aspect of the invention, data items are pushed to the mobile device through a routing system, which implements an associated routing method. The host system performing the data exchange is preferably repackaging the user's data items for transparent delivery to the mobile data device through the routing system. Any types of data items can be supported this way including data like: E-mail messages, calendar events, meeting notifications, address entries, journal entries, personal reminders, voice-mail messages, voice-mail notifications, database updates, video clips, music clips, audio files, ring tones, Java programs, software updates, games and any other computer-related data having a digital format.

An advantage of the present invention is that it may provide a system and method for continuously routing all forms of pushed information from a host system to a mobile data communication device. A further advantage of the invention is the provision of host systems in a rapid manner and providing world-wide access to mobile subscribers of a given host service. Other advantages of the routing aspects of the present invention include: (1) flexibility in coupling gateways, some of which are located behind a company firewall, to one or more network systems; (2) the provision of a central routing point or system solves the problem of pushing data to mobile devices on behalf of all gateways; (3) transparent repackaging and routing of the user data items in a variety of ways such that the mobile data communication device appears as though it were the host system; (4) a single routing system routes data items between pluralities of different networks; (5) the routing system and method routes data items without regard to their content, thereby providing for end-to-end security and effectively extending a firewall, for host systems or other gateways located behind the firewall, to the mobile device; (6) integration with other host system components such as E-mail, TCP/IP, keyboard, screen saver, webpages and certain programs that can either create user data items or be configured to provide trigger points; and (7) the routing system acts as a single demultiplexing point for all mobile traffic, thus facilitating and simplifying billing and provisioning.

According to an aspect of the invention, a routing system for routing data items between a first plurality of communication networks and a second plurality of communication networks, the routing system comprises receiver means for receiving data items from sending systems operating in any of the first plurality of communication networks, transmitter means for transmitting the received data items to destination systems operating in any of the second plurality of communication networks, and routing means for forwarding the received data items from the receiver means to the transmitter means, whereby a single routing system routes data items between sending systems and destination systems operating within different pluralities of communication networks.

In a related embodiment, the invention comprises a routing method for routing data items between any of a first plurality of communication networks and any of a second plurality of communication networks, the routing method comprising the steps of providing a receiving arrangement for receiving data items from sending systems operating in any of the first plurality of communication networks, providing a transmitting arrangement for transmitting the received data items to destination systems operating in any of the second plurality of communication networks, and forwarding the received data items from the receiving arrangement to the transmitting arrangement, wherein data items are routed between any communication networks within different pluralities of communication networks by a single receiving arrangement and a single transmitting arrangement.

At least one of the first and second pluralities of communication networks preferably includes wireless communication networks. In further preferred embodiments, the first plurality of communication networks comprises communication networks of different types and the second plurality of communication networks comprises communication networks of further different types.

These are just a few of the many advantages of the present invention, as described in more detail below. As will be appreciated, the invention is capable of other and different embodiments, and its several details are capable of modifications in various respects, all without departing from the spirit of the invention. Accordingly, the drawings and description of the preferred embodiments set forth below are to be regarded as illustrative in nature and not restrictive.

BRIEF DESCRIPTION OF THE DRAWINGS

FIG. 2 illustrates a functional.

DETAILED DESCRIPTION

Figure 1:
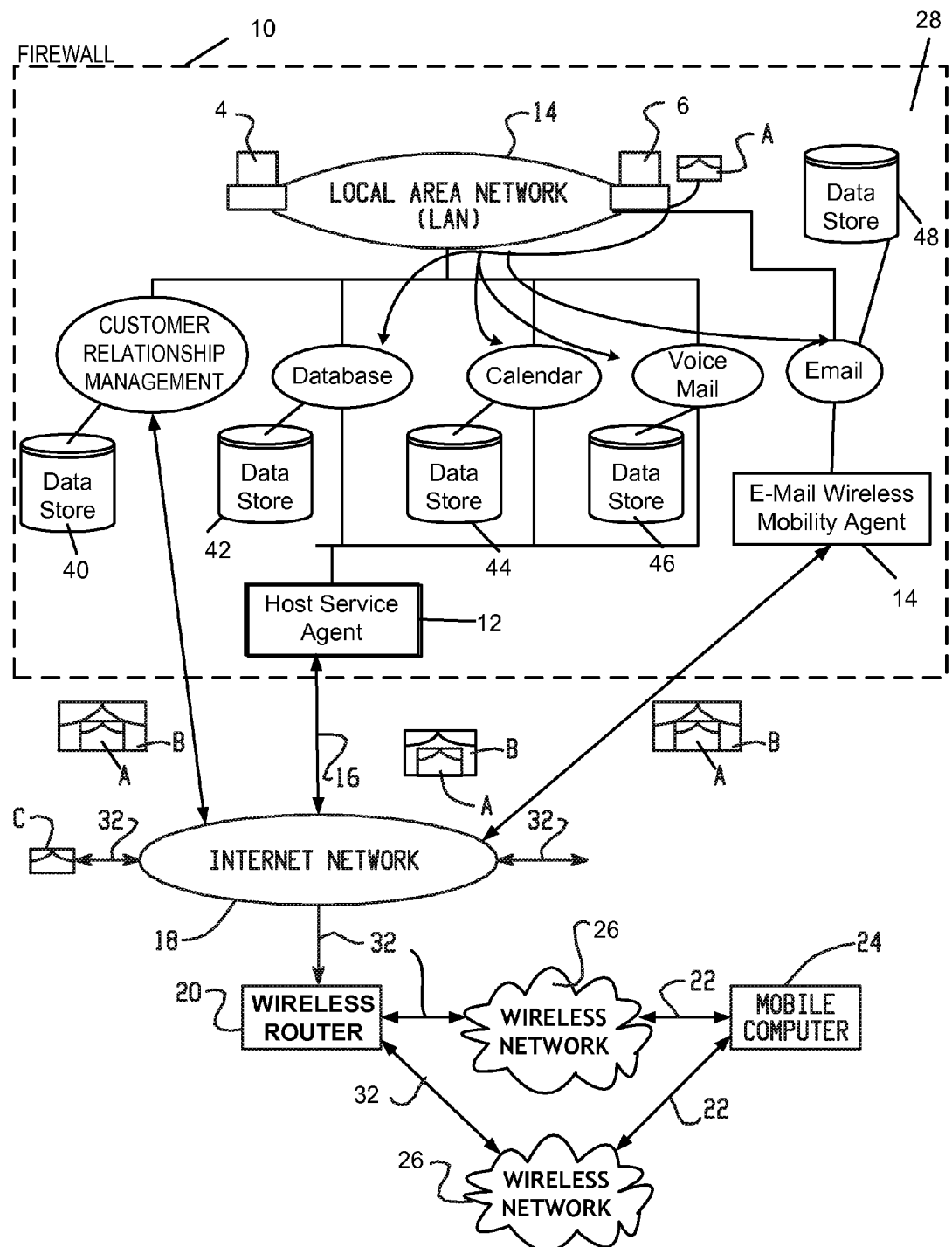
FIG. 1 is a system diagram showing the environment where the wireless router works with an example application, the Blackberry Enterprise Server software being used to push user data items from a user's mailbox (i.e. a mailbox maintained by a corporate mail server running within the corporate LAN) to the user's mobile data communication device.

Referring now to the drawings, FIG. 1 is an example system diagram showing the redirection of user data items (such as message A or C) from a corporate enterprise computer system (host system) 28 to the user's mobile device 24 via a wireless router 20. The wireless router 20 provides the wireless connectivity functionality as it acts to both abstract most of the wireless network's 26 complexities, and it also implements features necessary to support pushing data to the mobile device 24. Although not shown, a plurality of mobile devices may access data from the corporate enterprise computer network system. In this example, message A in FIG. 1 represents an internal message sent from desktop 6 to any number of server computers in the corporate LAN 14, including a database server 42, a calendar server 44, an E-mail server 46 or a voice-mail server 48. Message C in FIG. 1 represents an external message from a sender that is not directly connected to LAN 14, such as the user's mobile device 24, some other user's mobile device (not shown), or any user connected to the Internet 18. Message C could be e-mail, voice-mail, calendar information, database updates, web-page updates or could even represent a command message from the user's mobile device 24 to the host system 28. The host system 28 preferably includes, along with the typical communication links, hardware and software associated with a corporate enterprise computer network system, one or more wireless mobility agents 12, a TCP/IP connection 16, a collection of datastores 40 48, (i.e. for example a data store for e-mail could be an off-the-shelf mail server like Microsoft Exchange® Server or Lotus Notes® Server), all within and behind a corporate firewall 29.

Figure 3:
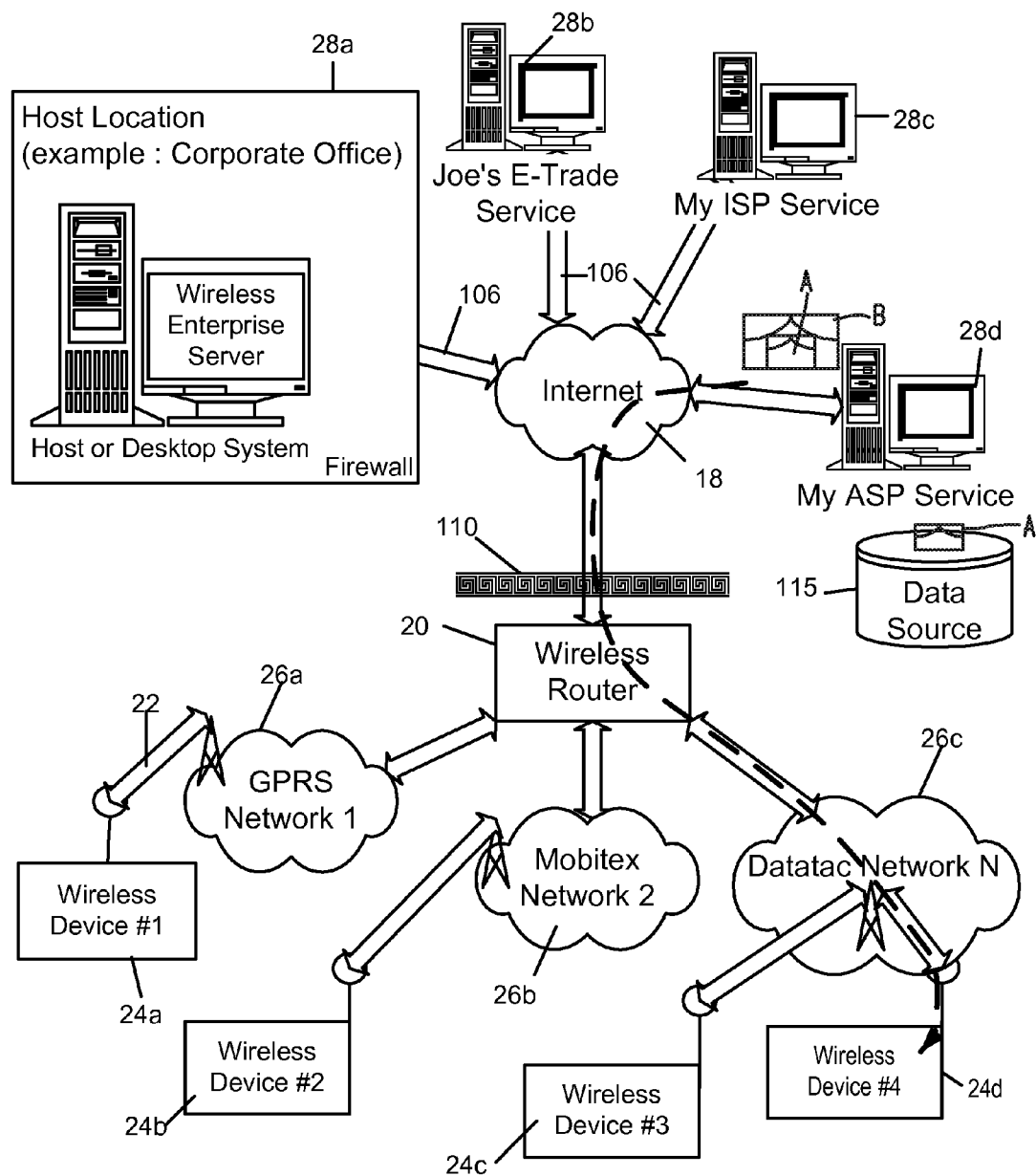
FIG. 3 is a system diagram showing a more complex environment where the wireless router can be used. In this figure the wireless router is dealing with a wide range of host services and many wireless networks.

FIG. 1 shows the invention being used within the corporate enterprise network environment, which is just one embodiment showing one type of host service 12 that offers push-based messages for a handheld wireless device that is capable of notifying and preferably presenting the data to the user in real-time at the mobile device when data arrives at the host system. FIG. 3 also shows a more detailed and complex environment with more types of host services. By using the wireless router 20 an important set of advantages are realized.

By offering a wireless router system 20 there are a number of major advantages to both the host service 12 and the wireless network 26. As mentioned earlier a host service 40-48 is considered to be any computer program that is running on one or more computer systems 28. The host service 40-48 is said to be running on a host system 28, and one host system 28 can support any number of host services 40-48. A host service 48 may or may not be aware of the fact that information is being channeled to mobile devices 24. For example an e-mail program 48 might be receiving and processing e-mail while an associated program (e-mail wireless mobility agent 14) is also monitoring the mailbox 48 and forwarding or pushing the same e-mail to a wireless device 24. A host service 40 might also be modified to prepared and exchange information with wireless devices 24 via the wireless router 20, like customer relationship management software 40. In a third example their might be a common access to a range of host services 42-46. For example a mobility agent 12 might offer a Wireless Access Protocol (WAP) connection to several databases. Connecting host services 28 to mobile devices 24 has long been a problem for the wireless community that has not grown anywhere near as fast as the land-line based Internet network. The current invention solves many problems when connecting host services to wireless networks and builds a bridge to improve the deployment of host services for mobile devices. These advantages include:

1. Reducing the financial and technical barrier of entry for most host services by removing the need for the host service provider to negotiate connections to the wireless networks.

If dealing directly with the network operator the host service provider would be required to purchase some form of router in order to connect to the wireless network (costing between $2,000 and $100,000). In some cases, this router may in fact be owned and managed by the network carrier, but with the costs passed onto the end customer. The cost of such a router may be prohibitive to a small company.

The communication connection to a network carrier is likely to require a leased communication line. The minimum bandwidth for a point-to-point connection is generally around 64 kbps, and at current pricing that is only cost effective for large numbers of mobile devices. The costs are prohibitive for a small or medium sized customer.

2. Allows host services to remain network independent.

Following from point 1 above if host services had to connect directly to wireless networks there could be extensive work and development costs to add proprietary conversations to those networks. For example, Mobitex™ and Datatac™, which are very old digital data networks in North America, have proprietary network formats and connection requirements to their networks.

Easier and faster installation of host software provided by third-party wireless software companies. Without the need to deal with network operators, and with the ability to use the Internet directly to communicate with the wireless router, the installation speed is much faster.

3. Roaming devices are supported transparently for the host service without extra communication connection requirements.

Without the wireless router, roaming would have to be handled either by each host service directly, through multiple communication connections into multiple wireless networks, or by the wireless networks themselves.

If a host service has mobile devices that operate on different carriers' networks, then the host service may be required to maintain a communication connection to each individual carrier. This may require a separate router for each connection, depending on circumstances, and thus increasing the costs listed in point 1 dramatically.

4. Allows host data to be pushed to the mobile device with no prior action being taken by the user.

With some of the network architectures being used it is nearly impossible to implemented host initiated push without a wireless router. In the GPRS network, for example, only the mobile device can initiate a PDP Context to acquire an IP address. Normally the IP address is a private, dynamically assigned IP address which is not visible to public host services. Therefore, to solve this problem the host system would have to become a private host service that is part of a virtual private network (VPN) run by the network carrier.

5. Provides a store-and-forward peer-to-peer communications channel so that messages can be exchanged between mobile devices and such exchanges do not rely on the two mobile devices being in network coverage at the same time. This also extends to host services and mobile device traffic, i.e. either end (host system or mobile device) can be temporarily unavailable and the wireless router will ensure a swift and timely delivery.

A major problem when implementing peer-to-peer communications between two mobile devices is the problem of one device being temporarily unavailable. By using a store-and-forward wireless router 20 a seamless communication path is provided between the two devices.

In the case when a host service 28 is temporarily not available, or the mobile device 24 is not available data is queued and delivered when the destination becomes available again. Since the wireless router 20 is created with long latency, out-of-coverage conditions in mind, there are proper transport mechanisms to ensure end-to-end delivery.

6. Provides an easy way to implement peer-to-peer messaging.

A wireless router 20 allows a community of mobile devices 24 to be defined so that peer-to-peer messaging or instant messaging can be defined. The wireless router 20 can even provide a handle (or name) for the mobile device user so that the device identifier does not have to be used.

A wireless router 20 can implement additional security for peer-to-peer communications, like a Public Key Infrastructure (PKI), so that encryption can be used to keep messages private. Another major problem with wireless communications is that encryption is often not considered due to the complexity. A wireless router 20 solution can solve a major problem with matching device identity with a Public Key per device.

7. When dealing with host services 28 that are private, i.e. corporate data residing behind a corporate firewall 10, security becomes a major issue.

If a relationship were to be established between the network operator and the host service, it is likely that the operator would want to initiate the communication connection to the corporate enterprise server. To ask a corporation to support an incoming TCP/IP connection is generally against all Information Technology policies at the corporation and such communication support is at a much higher risk for Internet-based attacks. When using a wireless router 20, the enterprise-based host service 28 has the ability to initiate an outgoing call to the wireless router 20 to solve this problem.

There is an uncertain level of security between the local corporate LAN and the mobile devices 24. When wireless enabling host services for mobile devices 24, they are essentially made part of the corporate LAN. Some wireless enabling methods open holes in the company firewall and could allow unwanted mobile devices 24 through to access private corporate data. Therefore special trust and security is required within the wireless router 20 to ensure this does not happen.

Figure 2:
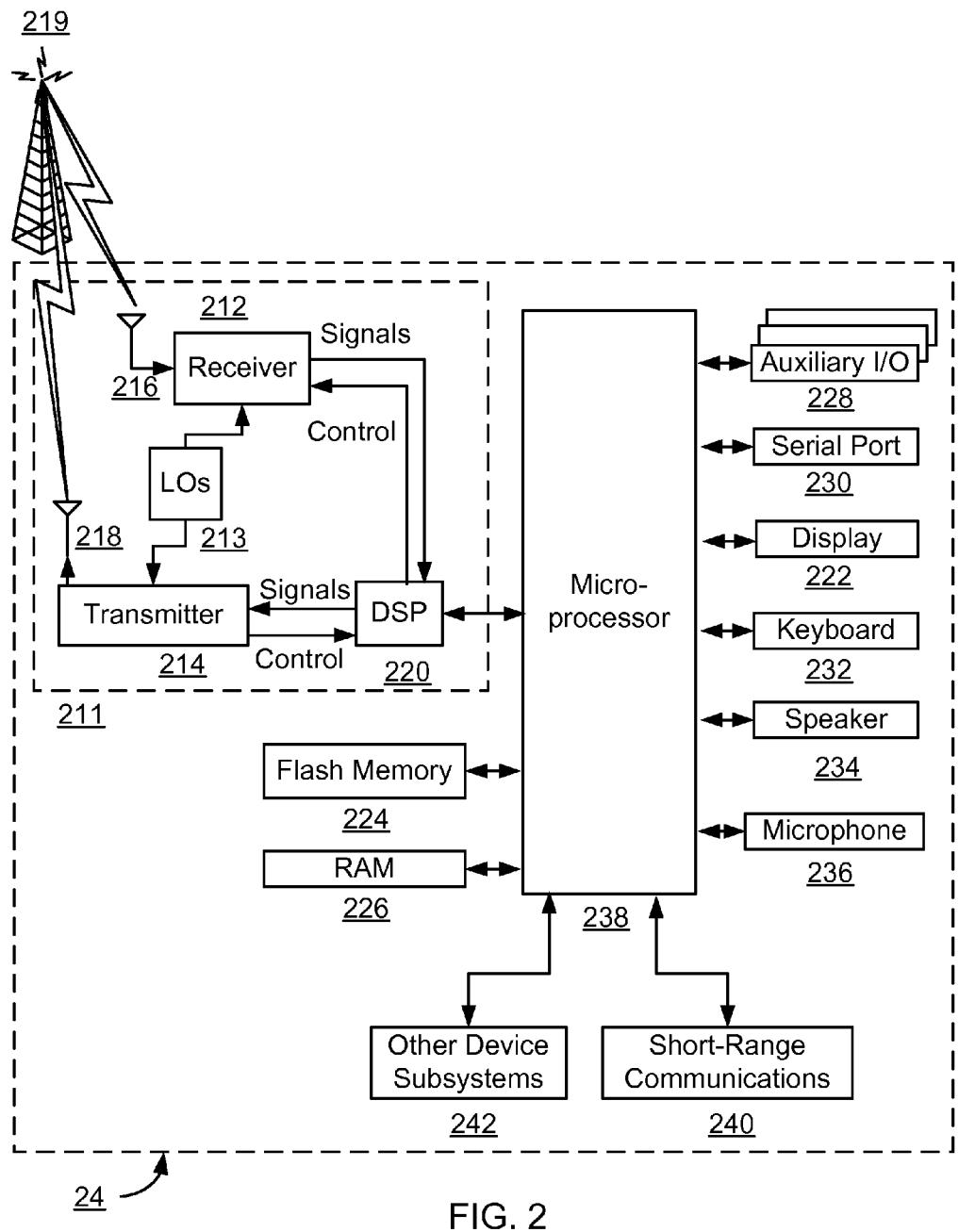
FIG. 2 is an illustration showing all the components within a dual-mode mobile device that can be used with this application.

A preferred mobile data communication device ("mobile device") 24 can either be: a hand-held two-way wireless paging computer as described in detail in FIG. 2, a wirelessly enabled palm-top computer, a mobile telephone with data messaging capabilities, a PDA with mobile phone capabilities, or a wirelessly enabled laptop computer, a vending machine with an associated OEM radio modem, a wirelessly-enabled heart-monitoring system or, alternatively it could be other types of mobile data communication devices capable of sending and receiving messages via a network connection 22. Although it is preferable for the system to operate in a two-way communications mode, certain aspects of the invention could be beneficially used in a "one and one-half" or acknowledgment paging environment, or even with a one-way paging system. In this limited data messaging environments, the wireless router 20 still could abstract the mobile device 24 and wireless network 26, offer push services to standard web-based server systems and allow a host service 28 to reach the mobile device 24 in many countries. The mobile device 24 includes software program instructions that work in conjunction with a destination host service 28 or wireless mobility agent 12 shown in FIG. 1.

A host service 28 using the present invention has many methods when establishing a communication link to the wireless router 20. For one skilled in the art of data communications the host services 28 could use connection protocols like TCP/IP, X.25, Frame Relay, ISDN, ATM or many other protocols to establish a point-to-point connection. Over this connection there are several tunneling methods available to package and send the data, some of these include: HTTP/HTML, HTTP/XML, HTTP/Proprietary, FTP, SMTP or some other proprietary data exchange protocol. The type of host services 28 that might employ the wireless router 20 to perform push could include: field service applications, e-mail services, stock quote services, banking services, stock trading services, field sales applications, advertising messages and many others. This wireless network 26 abstraction is made possible by the routing system 20, which implements this routing and push functionality. The type of user-selected data items being exchanged by the host could include: E-mail messages, calendar events, meeting notifications, address entries, journal entries, personal alerts, alarms, warnings, stock quotes, news bulletins, bank account transactions, field service updates, stock trades, heart-monitoring information, vending machine stock levels, meter reading data, GPS data, etc., but could, alternatively, include any other type of message that is transmitted to the host system 10, or that the host system 10 acquires through the use of intelligent agents, such as data that is received after the host system 10 initiates a search of a database or a website or a bulletin board. In some instances, only a portion of the data item is transmitted to the mobile device 24 in order to minimize the amount of data transmitted via the wireless network 22. In these instances, the mobile device 24 can optionally send a command message to the host service 40, 12 and 14 to receive more or the entire data item if the user desires to receive it. The wireless router 20 provides a range of services to make creating a push-based host service straightforward, which is essential to the success of wireless data networks. These networks can include: (1) the Code Division Multiple Access (CDMA) network that has been developed and operated by Qualcomm, (2) the Groupe Special Mobile or the Global System for Mobile Communications (GSM) and the General Packet Radio Service (GPRS) both developed by the standards committee of CEPT, and (3) the future third-generation (3G) networks like EDGE and UMTS. GPRS is a data overlay on top of the very popular GSM wireless network, operating in virtually every country in Europe. Some older examples of data-centric network include, but are not limited to: (1) the Mobitex Radio Network ("Mobitex"), which has been developed by Eritel and Ericsson of Sweden, and is operated by Cingular Corporation in the United States, and (2) the DataTAC Radio Network ("DataTAC"), which has been developed by Motorola and is operated by Motient Corporation, in the United States.

To be effective in providing push services for host systems 28 the wireless router 20 preferably implements a set of defined functions that solve one or more problems plaguing the art of wireless connectivity. For one skilled in the art, it is clear that one could select many different hardware configurations for the wireless router 20, but preferably the same or similar set of features would be present in the different configurations. The wireless router 20 offers the following one or more features for host services: 1. Implements an addressing method so that mobile device 24 traffic can be addressed to a host service 40, 12 and 14 without the need for the wireless network 26 to assign an identity to each host service 40, 12 and 14. This is a start to solving the abstraction problem for the host service 40, 12 and 14. 2. An efficient and authenticated method for the host service 20, 12 and 14 to initiate a communication connection to the wireless router 20 for the purposes of opening a communication tunnel to the one or more mobile devices 24 that the host service 40, 12 and 14 wishes to communicate with. 3. A reliable method for exchanging data between the host service 40, 12 and 14 and the mobile device 24, in a manner consistent with the abilities of the wireless network 26. 4. Providing feedback to the host service 40, 12 and 14 when data is delivered. This allows the host service 40, 12 and 14 to clean up any wireless delivery queues if necessary, or inform the original sender (user or program) that the data has been delivered to the mobile device 24. 5. Implementation of a wireless network 26 initiated push of services or data to a mobile device 24, from a wireless router 20. The mobile device 24 user preferably should not have to perform any special actions to receive the asynchronous messages sent from the host services 40, 12 and 14. 6. Connect to a wide range of wireless networks 26 and provide a way of tracking the user's location so that a follow you anywhere solution can be provided.

These features will be expanded and described in detail in FIGS. 3-8.

Turning now to FIG. 2 there is a block diagram of a mobile device 24 in which can support the wireless router 20 that is disclosed in this invention. The mobile device 24 is preferably a two-way communication device having at least data communication capabilities. The mobile device 24 preferably has the capability to communicate with other computer systems on the Internet. Depending on the functionality provided by the mobile device 24, the mobile device 24 may be referred to as a data messaging device, a two-way pager, a cellular telephone with data messaging capabilities, a wireless Internet appliance or a data communication device (with or without telephony capabilities).

Where the mobile device 24 is enabled for two-way communications, the mobile device 24 will incorporate a communication subsystem 211, including a receiver 212, a transmitter 214, and associated components such as one or more, preferably embedded or internal, antenna elements 216 and 218, local oscillators (LOs) 213, and a processing module such as a digital signal processor (DSP) 220. As will be apparent to those skilled in the field of communications, the particular design of the communication subsystem 211 will be dependent upon the communication network in which the mobile device 24 is intended to operate. For example, a mobile device 24 destined for a North American market may include a communication subsystem 211 designed to operate within the Mobitex mobile communication system or DataTAC mobile communication system, whereas a mobile device 24 intended for use in Europe or Asia may incorporate a General Packet Radio Service (GPRS) communication subsystem 211.

Network access requirements will also vary depending upon the type of network 219. For example, in the Mobitex and DataTAC networks, mobile devices such as 24 are registered on the network using a unique personal identification number or PIN associated with each mobile device 24. In GPRS networks however, network access is associated with a subscriber or user of a mobile device 24. A GPRS mobile device 24 therefore requires a subscriber identity module (not shown), commonly referred to as a SIM card, in order to operate on a GPRS network. Without a SIM card, a GPRS mobile device 24 will not be fully functional. Local or non-network communication functions (if any) may be operable, but the mobile device 24 will be unable to carry out any functions involving communications over network 219. When required network registration or activation procedures have been completed, a mobile device 24 may send and receive communication signals over the network 219. Signals received by the antenna 216 through a communication network 219 are input to the receiver 212, which may perform such common receiver functions as signal amplification, frequency down conversion, filtering, channel selection and the like, and in the example system shown in FIG. 2, analog to digital conversion. Analog to digital conversion of a received signal allows more complex communication functions such as demodulation and decoding to be performed in the DSP 220. In a similar manner, signals to be transmitted are processed, including modulation and encoding for example, by the DSP 220 and input to the transmitter 214 for digital to analog conversion, frequency up conversion, filtering, amplification and transmission over the communication network 219 via the antenna 218.

The DSP 220 not only processes communication signals, but also provides for receiver and transmitter control. For example, the gains applied to communication signals in the receiver 212 and transmitter 214 may be adaptively controlled through automatic gain control algorithms implemented in the DSP 220.

The mobile device 24 preferably includes a microprocessor 238 which controls the overall operation of the mobile device 24. Communication functions, including at least data and voice communications, are performed through the communication subsystem 211. The microprocessor 238 also interacts with further mobile device 24 subsystems such as the display 222, flash memory 224, random access memory (RAM) 226, auxiliary input/output (I/O) subsystems 228, serial port 230, keyboard 232, speaker 234, microphone 236, a short-range communications subsystem 240 and any other mobile device 24 subsystems generally designated as 242. Some of the subsystems shown in FIG. 2 perform communication-related functions, whereas other subsystems may provide "resident" or on-device functions. Notably, some subsystems, such as keyboard 232 and display 222 for example, may be used for both communication-related functions, such as entering a text message for transmission over a communication network, and device-resident functions such as a calculator or task list.

Operating system software used by the microprocessor 238 is preferably stored in a persistent store such as flash memory 224, which may instead be a read only memory (ROM) or similar storage element (not shown). Those skilled in the art will appreciate that the operating system, specific mobile device 24 applications, or parts thereof, may be temporarily loaded into a volatile store such as RAM 226. It is contemplated that received communication signals may also be stored to RAM 226.

The microprocessor 238, in addition to its operating system functions, preferably enables execution of software applications on the mobile device 24. A predetermined set of applications which control basic mobile device 24 operations, including at least data and voice communication applications for example, will normally be installed on the mobile device 24 during manufacture. A preferred application that may be loaded onto the mobile device 24 may be a personal information manager (PIM) application having the ability to organize and manage data items relating to the mobile device 24 user such as, but not limited to e-mail, calendar events, voice mails, appointments, and task items. Naturally, one or more memory stores would be available on the mobile device 24 to facilitate storage of PIM data items on the mobile device 24. Such PIM application would preferably have the ability to send and receive data items, via the wireless network. In a preferred embodiment, the PIM data items are seamlessly integrated, synchronized and updated, via the wireless network, with the mobile device 24 user's corresponding data items stored or associated with a host computer system. Further applications may also be loaded onto the mobile device 24 through the network 219, an auxiliary I/O subsystem 228, serial port 230, short-range communications subsystem 240 or any other suitable subsystem 242, and installed by a user in the RAM 226 or preferably a non-volatile store (not shown) for execution by the microprocessor 238. Such flexibility in application installation increases the functionality of the mobile device 24 and may provide enhanced on-device functions, communication-related functions, or both. For example, secure communication applications may enable electronic commerce functions and other such financial transactions to be performed using the mobile device 24.

In a data communication mode, a received signal such as a text message or web page download will be processed by the communication subsystem 211 and input to the microprocessor 238, which will preferably further process the received signal for output to the display 222, or alternatively to an auxiliary I/O device 228. A user of mobile device 24 may also compose data items such as email messages for example, using the keyboard 232, which is preferably a complete alphanumeric keyboard or telephone-type keypad, in conjunction with the display 222 and possibly an auxiliary I/O device 228. Such composed items may then be transmitted over a communication network through the communication subsystem 211.

For voice communications, overall operation of the mobile device 24 is substantially similar, except that received signals would preferably be output to a speaker 234 and signals for transmission would be generated by a microphone 236. Alternative voice or audio I/O subsystems such as a voice message recording subsystem may also be implemented on the mobile device 24. Although voice or audio signal output is preferably accomplished primarily through the speaker 234, the display 222 may also be used to provide an indication of the identity of a calling party, the duration of a voice call, or other voice call related information for example.

A serial port 230 in FIG. 2 would normally be implemented in a personal digital assistant (PDA)-type communication device for which synchronization with a user's desktop computer (not shown) may be desirable, but is an optional mobile device 24 component. Such a port 230 would enable a user to set preferences through an external device or software application and would extend the capabilities of the mobile device 24 by providing for information or software downloads to the mobile device 24 other than through a wireless communication network. The alternate download path may for example be used to load an encryption key onto the mobile device 24 through a direct and thus reliable and trusted connection to thereby enable secure mobile device 24 communication.

A short-range communications subsystem 240 is a further optional component that may provide for communication between the mobile device 24 and different systems or devices, which need not necessarily be similar devices. For example, the subsystem 240 may include an infrared device and associated circuits and components or a Bluetooth™ communication module to provide for communication with similarly-enabled systems and devices.

FIG. 3 is a high-level block diagram of a preferred embodiment of a routing system by which data items are routed to and from the mobile devices 24 in accordance with a further aspect of the invention. FIG. 3 introduces further complexity into the system in which the invention is used. As shown in FIG. 3, information services such as the Wireless Enterprise Server 28a, Joe's E-Trade Service 28b, My ISP Service 28c, and My ASP Service 28d are all connected via WAN 18 to the wireless routing system 20. As described in FIG. 1, it is assumed in this figure that any of these host systems 28 can have one or more wireless enabled host services 40, 12 and 14 running within a computer running at the host system 28. For the remaining parts of this application this relationship will be assumed. The wireless router 20 may be distributed across different geographic boundaries for redundancy and fault tolerance. As will be apparent to those skilled in the art, the arrangement shown in FIG. 3 assumes that wireless networks 26a, 26b and 26c are packet-based communication networks, although the invention is not limited thereto. Packet-based wireless networks 26 are widely used for data transfer and are therefore preferred for implementation of the invention. The mobile device 24 is adapted for communication within wireless network 26 via wireless links 22, as required by each wireless network 26 being used. As an illustrative example of the operation for a wireless routing system 20 shown in FIG. 3, consider a data item A, repackaged in outer envelope B (the packaged data item A now referred to as "data item (A)") and sent to the mobile device 24 from an Application Service Provider (ASP) 104. Within the ASP is a computer program, similar to the wireless mobility agent 12 or 14 in FIG. 1, running on any computer in the ASP's environment that is sending requested data items from a data store 115 to a mobile device 24. The mobile-destined data item (A) is routed through the Internet 18, and through the wireless router's 20 firewall protecting the wireless router 20. Only authorized host systems can exchange data with mobile devices 24, thus reducing the chances of denial of service attacks or other security problems. Each host system is configured and setup by the operator of the wireless router 20. For one skilled in the art of firewall configuration this can easily be performed through direct operator commands, through a web interface, manually or programmatically. The wireless router 20 examines the mobile address information contained in the outer envelope B to determine which wireless network 26 to route the data item (A) to. The wireless router 20 then routes the data item (A) based on the mobile address in envelope B and then transmitted to the mobile device 24d over wireless network 26c. In this example, the data item A could be an E-Mail sent from an Internet mail account, a calendar event, a database inventory item level, a field service call or other important, 'just-in-time' pieces of data residing primarily at the host system 28d. As shown in subsequent diagrams the wireless router 20 may also track the location of the wireless device 24 by following incoming traffic patterns, by receiving any information provided by the wireless network 26, and by receiving registration signals from the mobile device 24 when the user changes wireless networks 26. This later case may be performed manually by the user of the mobile device 24, so the RF component of the mobile device 24 can change frequency tables to match the new country being used. At any time a wireless device 24 might roam between wireless networks 26, so that a new path is required for data items. The path it takes might involve serious time delay as the user flies to another country or a different part of the same country. During this out-of-coverage blackout, the wireless router 20 is storing all data items to be eventually transmitted to the mobile device 24, and is periodically attempting to re-send any stored data items to see if the mobile device 24 has returned to a coverage area.

Another major advantage of the wireless router 20 is that the host services 28 do not have to connect to every wireless network 26 they wish to support. This connection requirement to the wireless network 26 is done once by the wireless router 20 and can be used by all host services 28 connecting to the wireless router 20. This connection to multiple networks could involve similar networks, dissimilar networks, or even different revisions of the same network. For a single company supporting a community of wireless mobile device users, it is very likely that a range of dissimilar mobile devices 24 will need support from a single host. The wireless router 20 can handle this, insofar as it provides a common access to all dissimilar networks and makes the task of hosting a host service relatively simple. In one embodiment, a network carrier may manage and operate only one wireless network 26, while another network carrier may manage and operate more than one wireless networks 26. Hence, the wireless router 20 facilitates the connectivity into and from one or more network carriers and their respective one or more wireless networks 26.

Figure 4:
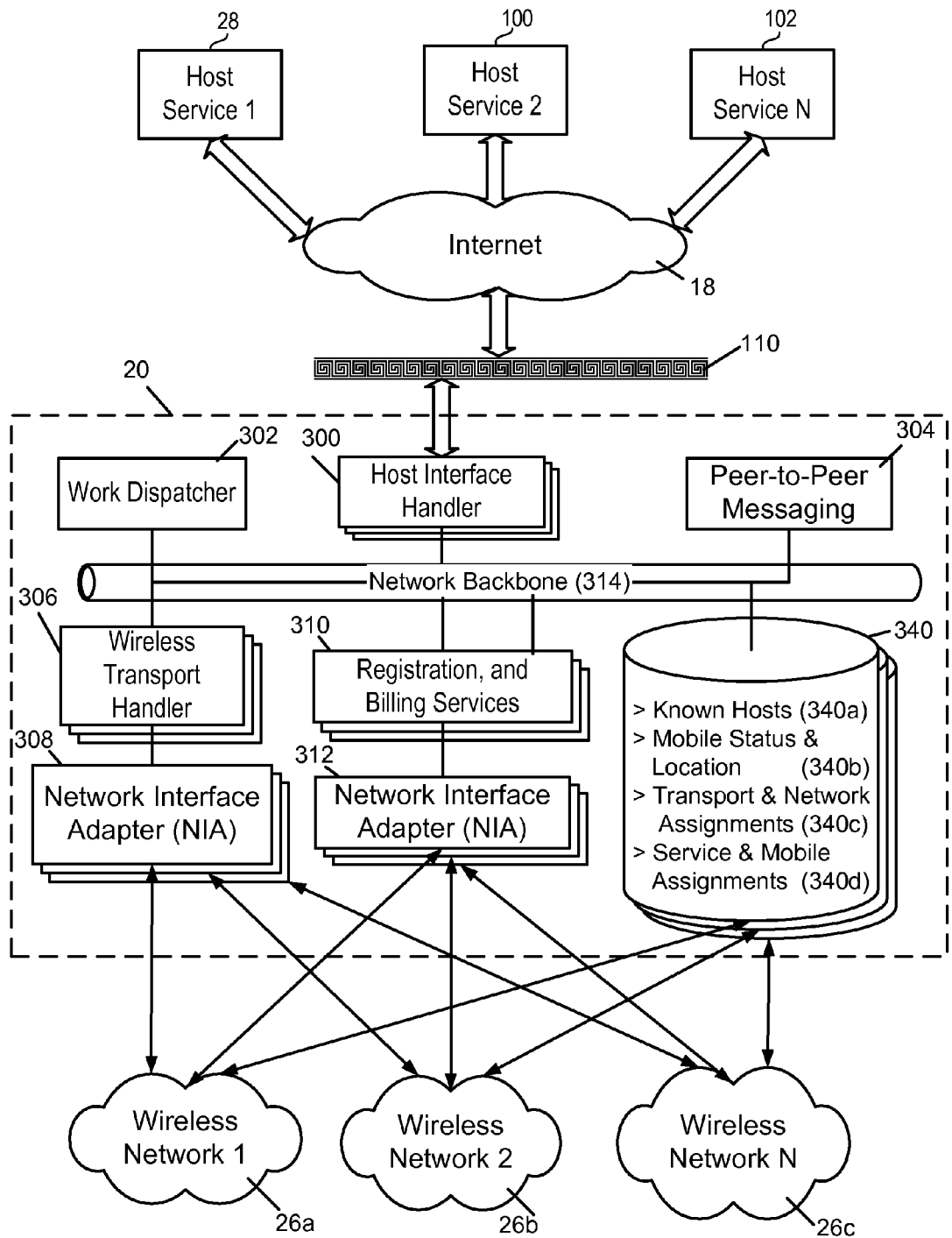
FIG. 4 is a detailed diagram showing one embodiment for the internal components of the wireless router.
Figure 8:
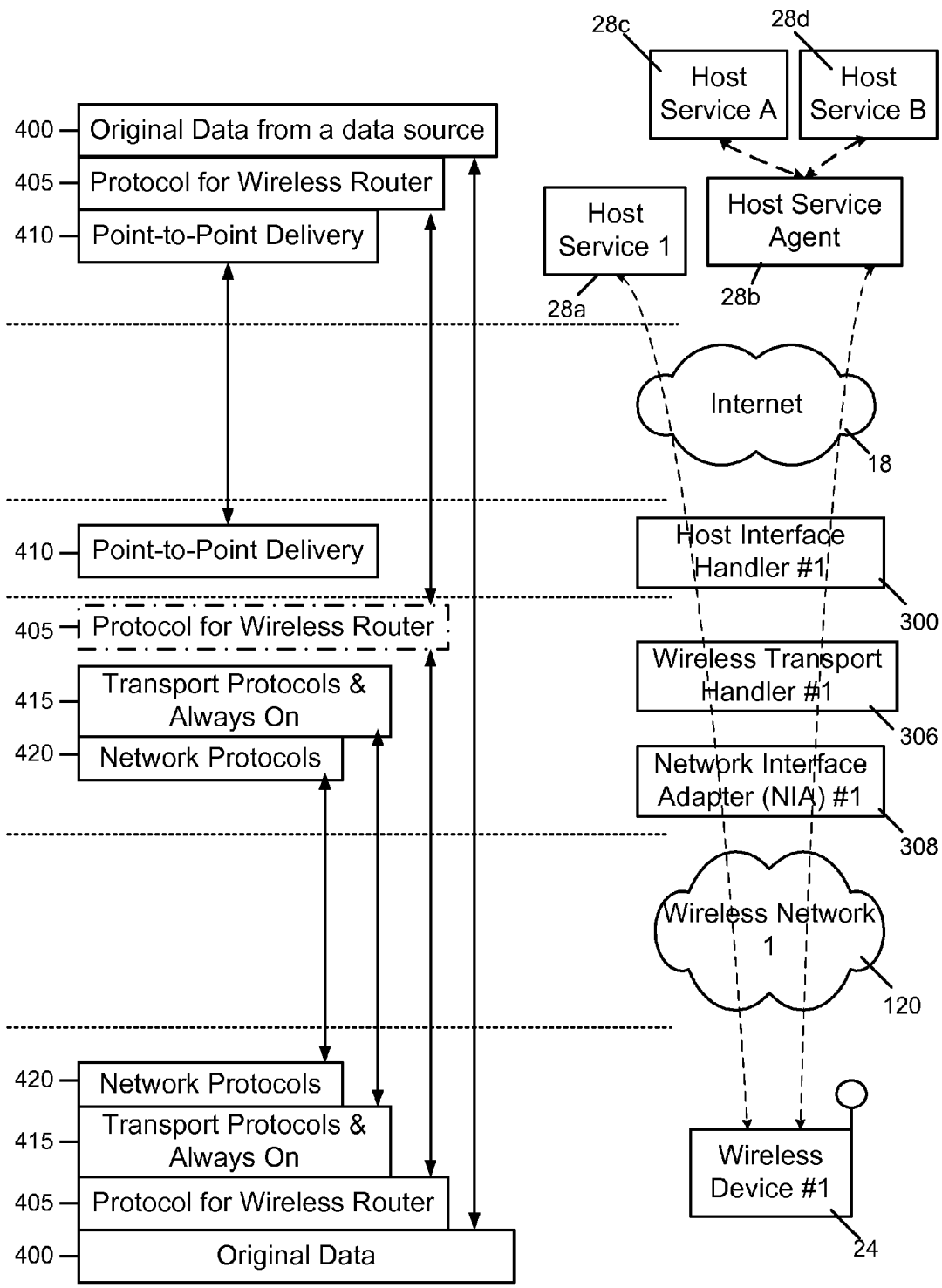
FIG. 8 is a protocol diagram showing how the different protocol layers work between each component and the purpose each protocol layer serves.

To provide this abstraction between the wireless network 26 and the host service 28 the wireless router 20 implements an addressing and router abstraction methodology. This method results in the wireless network 26 not needing to know about the host service 28, and the host service 28 not needing to know about the wireless network 26. This abstraction is implemented by assigning each host service a Host Service Identifier or "Host Service Id". From the host service's point of view, the Host Service Id effectively replaces an identifier assigned by the wireless network 26. For example, in a Mobitex wireless network, this identifier is called a Fixed Station Terminal (FST) number, in a Datatac wireless network, this identifier could be called a Net ID and in GPRS this identifier could be associated to the Access Point Node (APN). The wireless router 20 assumes this wireless network-centric address and the host services are given a Host Service Id created by the wireless router system 20. Each host service 28 that is sold, licensed or enabled to wirelessly provide data to the mobile device is assigned a special Host Service Id number. This could be a string, an IPv4 address, an IPv6 address or a proprietary string. The string is then manually or automatically configured within the wireless router 20; in preferably a database structure operating at or associated with the wireless router. As each host service 28 tries to connect and validate itself, the Host Service Id is used to confirm the identity of the host service 28, and to locate the correct database entry for the host service 28. FIG. 8 illustrates a preferable set of the protocol layers to perform this routing and abstraction just discussed. In reference to FIG. 4 this is a detailed diagram showing the components within the wireless router 20. The components inside of the wireless router 20 include a component that deals with host service connectivity called the host interface handler (HIH), a component that deals with guaranteed message reception and delivery (wireless transport handler (WTH)), and a component to deal with all the wireless network connections called the network interface adapter (NIA). Also described are support components that provide work assignments (called the work dispatcher), the billing and registration services component, and a database component that provides continuity, state- and configuration information to the entire wireless router system. All the components are preferably tied to a backbone 314, which can be any number of high-speed LAN technologies using Ethernet, Fiber or any other LAN methods available. This high-speed backbone between all the components is designed to distribute the work and provide fault tolerance. For one skilled in the art, there are several off-the-shelf products to provide distributed and fault tolerant work and message queuing systems. The most prominent of these are the IBM® MQ Series products and TIBCO™ Rendezvous products. Such products may, for example, provide an information bus that provides a publish/subscribe architecture that can be used to built redundancy, scalability and other major features. This product is used in many major financial institutions and to power the backbone of portal networks and search engines. Turning now to FIG. 4 the first major component that is present but not directly part of the wireless router 20 is an Internet firewall 110. The firewall 110 acts as a form of protection from Internet hackers that attempt to send data to wireless devices 24 without authorization. This firewall preferably may be off-the-shelf and would protect the wireless router 20 at a lower IP-". layer type protocol. Once through the firewall, the host service 28 connects to one of a plurality of host interface handlers (HIHs) 300. There can be any number of HIHs depending on the number of hosts that are configured and required in the system. The method used for this connection and for authorization of the connection is detailed in FIG. 5 as will be described later. The HIH component uses various parts of the database 340 to confirm and register the incoming host connection 28. The known hosts 340a sub-component of the database provides a way of validating that the host is known and marking its state as 'present' once the host is connected and authorized. Preferably, once the host connection is established, a secure and authenticated point-to-point communication connection is ready for the exchange of data between the host system or service and the wireless router. In an embodiment of the present invention, there are a plurality of such communication connections between the wireless router and a plurality of host system or services.

The next component that works closely with the HIH 300 is called the wireless transport handler (WTH) 306. The WTH 306 takes responsibility for data item transfer to and from the mobile device 24. Depending on the load of traffic, and the number of mobile devices in the system, there may be a plurality of WTH 306 components operating in the system. The LAN backbone 314, using something like a TIBCO queuing system, combined with the work dispatcher 302, allows each component of the system to scale as large as needed. The WTH 306 component will be expanded and described further in FIG. 6. The next component is the network interface adapter (NIA) 308, which could have a communications link directly to the WTH 306, or the NIA 308 could be accessible via the LAN network backbone 314. This alternative embodiment is shown in greater detail in FIG. 6. The NIA 308 provides the direct interface to the wireless network 26 being supported. Since many of the current wireless data networks 26 have unique communication connection requirements, this component preferably buffers the other wireless router components from many of the specific nuances of the particular wireless network it is in communication with. In a preferred embodiment, the NIA 308 isolates the WTH 306 from much of the details of communication links and physical interface requirements of each wireless network 26. There could be any number of wireless networks 26, all with their own connection methods. In some it could be a proprietary protocol over X.25, like the Mobitex or Datatac networks. In other it could be a proprietary protocol over TCP/IP, like newer version of the Datatac network. In other cases, it could be an IP connection, supporting either a TCP or UDP data exchange method, like the CDMA, W-CDMA, and GPRS networks.

To further enhance the wireless router 20 there are other support components that could either exist separate, or be built into a single component. The first of these is the work dispatcher 302. The work dispatcher's 302 role is defined more clearly in FIGS. 5 6. One of the functions of the work dispatcher 302, is to assign a specific WTH 306 to a mobile device 24 so that all data items are routed through the same WTH 306. If a WTH 306 fails, the work dispatcher 302 finds a new WTH 306 to take its place. Additionally, if one WTH 306 becomes too busy or is handling an undesirably large traffic load, the work dispatcher 302 can assign data items that are to be routed to the mobile devices 24 to instead round robin to multiple WTHs 306. This is one example of how the fault tolerant and scalable system is built, and a fault tolerant queuing system like TIBCO may solve this problem very easily. In the other direction, the work dispatcher 306 finds the correct HIH 300 to accept data items from mobile devices 24. Since a host service 28 can preferably connect to any HIH 300, the work dispatcher 306 finds the HIH 300 that has responsibility for or is associated with the host-router communication connection initiated by the correct host service 28, and routes the data appropriately. Recall that each host service 28 connects and is assigned round robin to the next available HIH 300. This process is described in detail in FIG. 5.

Another preferable component in the wireless router is the peer-to-peer (P2P) messaging component 304. This component is optional, but provides desirable peer-to-peer message routing facility, which allows mobile devices 24 to send directly to other mobile devices 24. The P2P component can perform the functions similar to an Instant Messaging gateway, but in this case for mobile devices 24. In some networks, where the mobile's identity might not be static, a mobile device 24 cannot easily send a message to another mobile device 24. In other networks SMS (short message service) solves this problem and provides a limited 160 character data exchange. The wireless router 20 has a store and forward structure that permits it to offer SMS and wireless messaging simultaneously to all wireless devices 24.

Registration and billing are two other components 310 that have been combined into one area. These two components could be separated or merged, it is the functionality that is important. Registration involves keeping track of all valid mobile devices 24 and tracking their location when they make major wireless network 26 changes. These changes are propagated to the associated database 340 and used by the work dispatcher 302 for important work assignment decisions. For example if a mobile device 24 travels to another country it might be necessary to move the responsibility of data item delivery to another WTH 306 component. As part of the registration function, the user of the mobile device 24 will be provided with added security. Services and mobile devices must be registered and authenticated before they can exchange data.

The billing component keeps a running tally of the services and amounts of data exchanged between each host service 28 and each mobile device 24. The billing component receives messages via the LAN network backbone. For example by using a TIBCO architecture it would be possible to broadcast billing messages to a group of billing components 310. Depending on the load of traffic multiple billing components 310 could be processing and saving the billing information to the database 340. Each record could have lots of information pertinent to generating complex and relevant billing information. For example it might be possible to save the size of the data exchanged, the time of day, the duration, the type of service access and other key pricing elements. There is a more detailed description of this operation in FIG. 7.

Another optional component would be the additional network interface adapter (NIA) 312 being used for registration and billing 310. This additional NIA 312 is present to ensure that normal packet traffic does not delay or hold up registration, billing and security services 310. A common registration method within the registration and billing component, would be for receiving registration packets when a mobile device 24 first starts, or when they change countries. Normally billing and registration information is very critical so the wireless router 20 has the flexibility in design to provided dedicated NIAs 308 for this purpose.

In reference to FIG. 8, this diagram presents preferable protocol layers used within the host service 28, within the wireless router 20 and within the mobile device 24. One reason the wireless router 20 can offer the services and features it does is because of the protocol layers used to exchange data. Other protocols or protocol layers could be substituted for Internet standard protocols.

Turning now to FIG. 8 the first protocol layer in the host service 28 is the original data 400. The original data 400 acts as the payload of the message, i.e. the data that is communicated to the mobile device 24. The original data of the message 400 might be extracted from some database for the purposes of being pushed to the device 24, it could be a response to a request from the device 24, or could be real-time response to a mobile device's 24 query. In some cases, only a portion of the original data is acts the payload. The original data could have a wide-range of data processing and transformations performed on it. For example, the data could be tokenized, transcoded, compressed, encrypted, signed, authenticated, encoded, enveloped, or may other data transforming steps. These transformations are common in wireless data transmissions to optimized bandwidth, reduce cost, provide end-to-end security or to provide authentication services. When the host service is within a corporate enterprise computer system environment, security is mandatory, so that all sensitive or confidential corporate data is not compromised. This processing preferably takes place before the data exits the firewall of the corporate enterprise computer system. The message could also be tokenized, translated or some other transformation could be applied to it. For one skilled in the art of protocols, it is clear that the payload could be 'prepared' for shipment in many ways depending on the requirements of the sender and receiver. Once the correct enveloping is performed, the original data is then given to the protocol for the wireless router 405 layer to prepare it for the next step.

The protocol for the wireless router 405 is primarily a routing protocol for the wireless router 20. A goal of the protocol for the wireless router 405 is to carry a 'destination' field that indicates the destination of the message. Another use of the protocol for the wireless router 405 is to provide a control field for demultiplexing information ("control information") at the host system. FIG. 1 shows a Host Service Agent 12 that is demultiplexing one data communication connection to the wireless router 20 across three host services 42-46. This control information can be carried in the protocol for the wireless router 405 and would be preferably transparent to the wireless router 20. Transparent in the sense that the wireless router need not act on the control information. The presence of the protocol for the wireless router 405 provides a method to abstract the wireless network 26 from the host service 28, and it can facilitate a method for abstracting the address of the wireless device 24 from the host service 28. For example if the mobile device 24 address, as used by the wireless network, is a dynamically assigned, private IP address, (created in some cases by the wireless network), then multiple mobile device addressing translation can be performed within the wireless router 20. The protocol for the wireless router 405 adds routing information for the wireless router in either direction (i.e., data traffic from the mobile device to the host service or data traffic from the host service to the mobile device), depending on the destination. When the host service 28 is sending a message to the mobile device 24, the message includes at least the original data 400, the protocol for the wireless router 405 and an identifier that corresponds to the mobile device 24. This identifier could be a real device identifier like a MAN (Mobitex Access Number) identifier or LLI (Logical Link Identifier) identifier, as used in the Mobitex and Datatac networks respectively. Other examples include a serial number for the mobile device, an email address or codename of the user of the mobile device. The identifier could also be an IP address, MSISDN or IMSI in the case of GPRS. In some situations, i.e. when using dynamic, private IP addresses in GPRS, the device identifier could be a PIN-like number assigned at manufacturing time. In this latter case, the wireless router 20 preferably has the ability to dynamically map 'Device PIN' to 'Real Device ID' within the wireless router database 340 as data items arrive at the wireless router. In the other direction, when the message comes from the mobile device 24 to the host service 28 the destination field is the Host Service Id. The Host Service Id allows the wireless router 20 to locate the correct host for the data message. The mobile device 24 is given the Host Service Id preferably when it first registers for the host service, either over the wireless network ("over the air") or through a separate channel, i.e. a telephone call and it can be manually entered by the user. In other cases, when the mobile device is initialized at the corporate enterprise computer system or at the mobile device reseller, distributor or manufacturer with one or more host services, the mobile device is populated with the corresponding host service identifiers. For one skilled in the art there could be some further additions made to this protocol, or other ways to encode the information, but the intent is the same. For example, it might be possible to place some limited control information into the protocol for the wireless router to inform the receiver that the original data 400 is encrypted or compressed. There could be a control code so that a representation of the command could be exchanged between the two end points, meaning that there would be no original data 400 in the data item. Another piece of information that could be added, may be a host service name. The service name could be used by a Host Service Agent 28b to demultiplex and send data to multiple host services above it 28c and 29d. In this situation the host service name is used as a control code between one or more mobiles and the Host Service Agent 28b. One advantage of doing this is that only one host-router communication connection from the Host System is required, instead of two. This reduces the number of holes in the firewall 10, which would reduce security risks and be more acceptable to the IT department managing the corporate enterprise computer system for the host system.

Once this protocol for the wireless router 405 is added it may be transported across a communications connection/link to the wireless router 20. As already discussed there are many protocol choices for carrying the original data 400 and the protocol for the wireless router 405 to the wireless router 20 from the host system or service. The TCP/IP and HTTP/XML choice are preferred. The main goal of this protocol is to provide a tunnel across the communications connection/link between the host system 28 and the wireless router 20. The tunnel carries all data in both directions and any other control information required between the two ends. The point-to-point delivery protocol 410 preferably provides one or more of the following properties: (a) It should be continuously connected so that data can flow quickly and easily with little overhead. Since large quantities of data are being exchanged asynchronously with a community of mobile devices 24 it is important to stay on-line constantly and add little overhead. (b) It should allow for control messages to be exchanged with the wireless router 20. During transmission and reception of data it is important to have the ability to acknowledge packets have been delivered. Since one pipe is carrying the payload for a community of mobiles there is a lot of control data being exchanged. (c) It should be able to offer flow control and guaranteed end-to-end acknowledgments. Since the wireless networks are generally slower then land-line networks it is important the wireless router 20 can flow-control and throttle the host service 28. When the host service 28 is pushing information to mobile devices 24 this has the potential to overwhelm the storage and delivery capacity of the wireless router 20. If messages aren't getting through to the mobile device 24 the host service 28 should naturally be told to hold back delivering more data until the first data items are delivered. This is already possible by using the message acknowledgements on a per-mobile basis, but a situation can occur where a given host service 28 is overwhelming the wireless router 20 with data across thousands of mobile devices 24.

Figure 5:
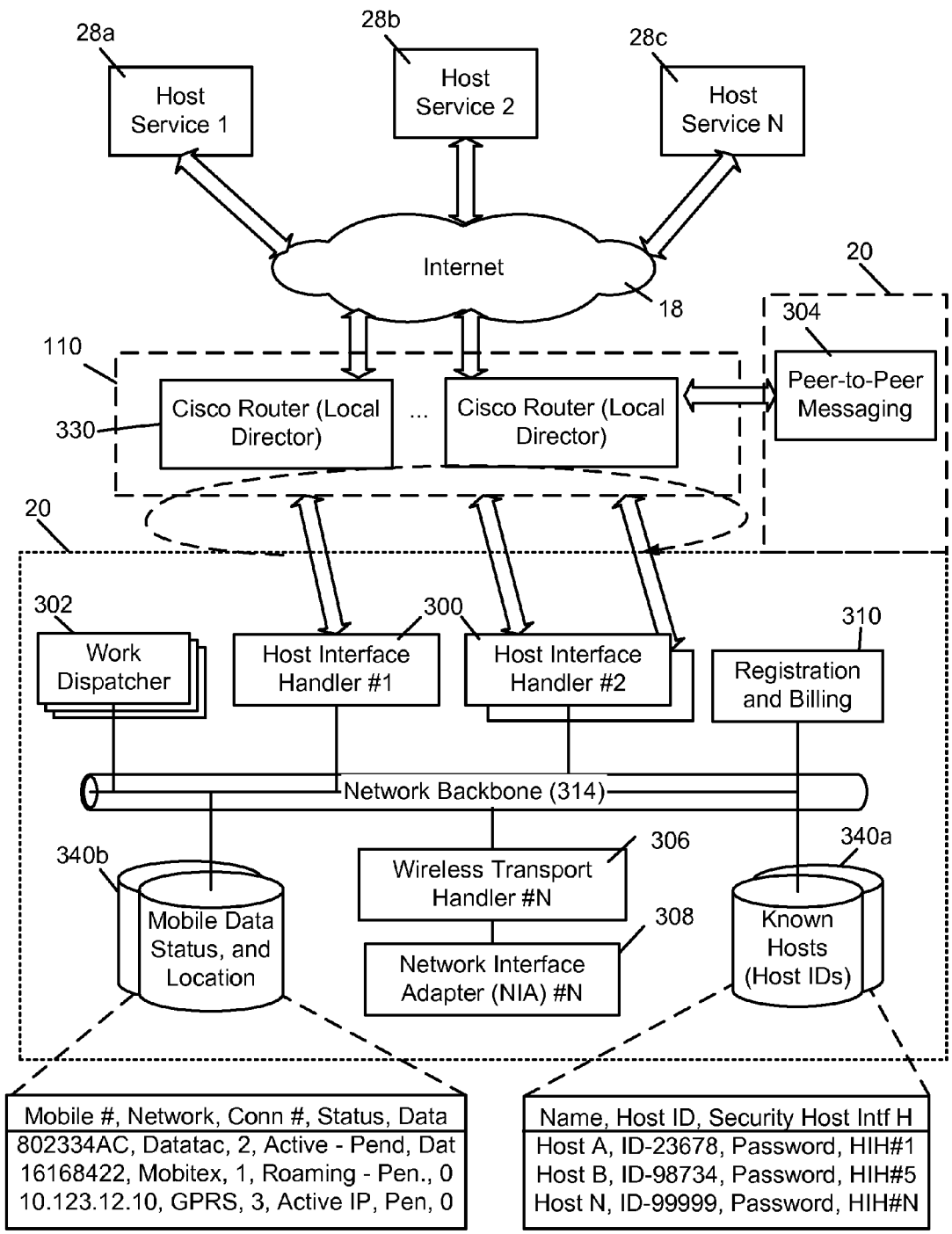
FIG. 5 is a detailed diagram expanding on the host interface handler within the wireless router. This component is responsible for support all data exchanges with host systems wishing to communicate with mobile devices.
Figure 7:
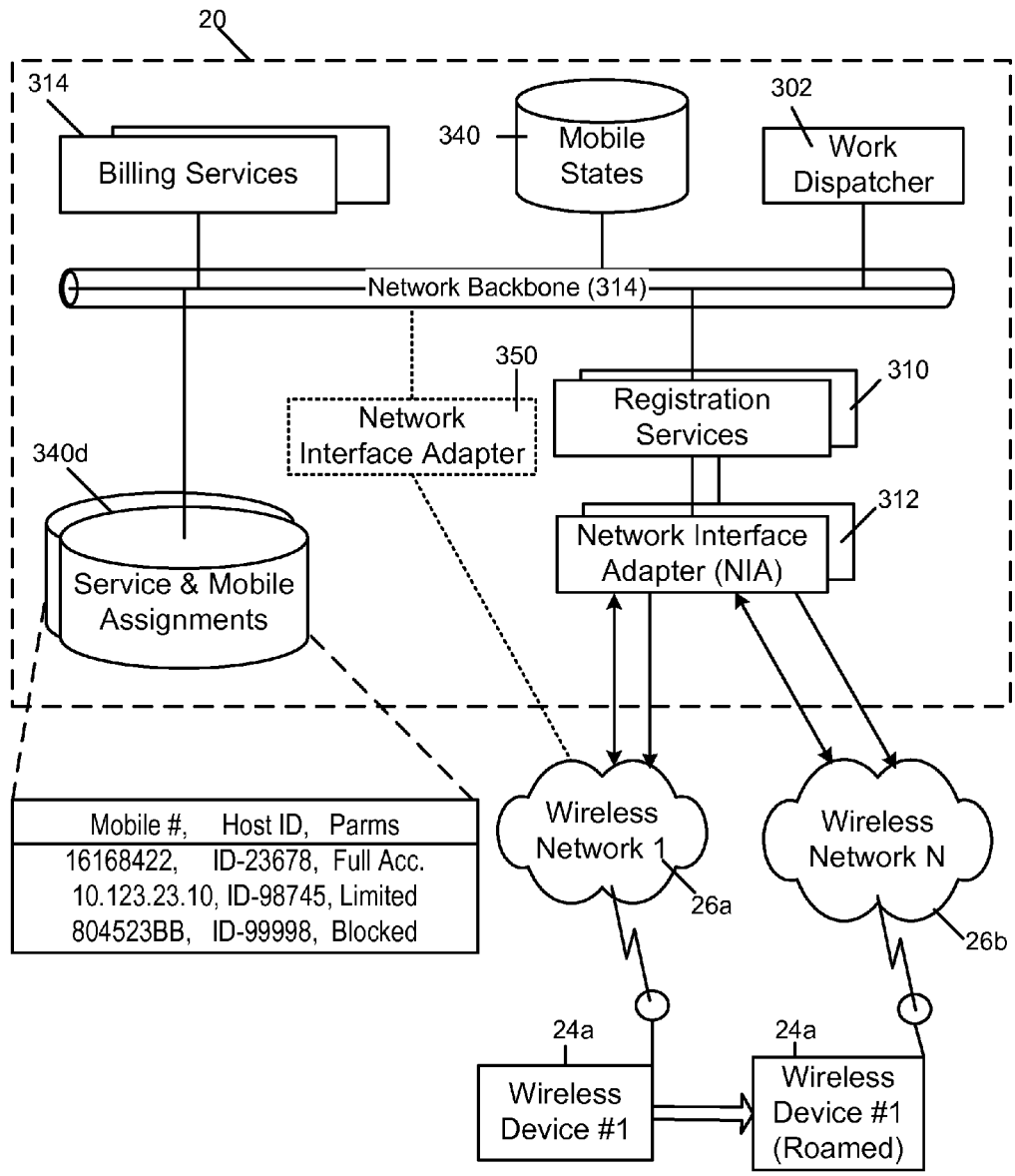
FIG. 7 is a detailed diagram of the registration and billing components within the wireless router. These components allow the mobile to update their location and provide billing records as the mobile performs different operations.

Once the point-to-point delivery 410 of the original data 400 and the protocol for the wireless router 405 is complete, the wireless router 20 can route the message based on the protocol for the wireless router 405. It performs this routing by looking in the destination field of the protocol for the wireless router 405. The destination field will either have a mobile device 24 identifier, or a Host Service Id. FIGS. 5 7 describe in greater detail how this routing function takes place. If the message is going towards the mobile device 24, the wireless router 20 adds a transport layer 415 for guaranteed delivery and performs any necessary 'always on' activities 415 to assure it can reach the mobile device 24. For example in GPRS the always on activities might involve sending an SMS message to the device 24 requesting that it activate a PDP Context and get an IP address assigned to it. The transport protocol may range in design and style. In the other direction the wireless transport 20 would strip off the wireless transport protocol 415. What is generally important in the transport layer 415 are one or more of the following properties: (a) It should be designed as a loosely-coupled transport of information to the wireless device 24. This means that using a session-based, aggressive message delivery can be a problem. Given the number of marginal coverage and out-of-coverage anomalies that can take place in the wireless network 120, 130, 140 the transport should have some 'very lax' delivery requirements to ensure messages are received. (b) It should offer a connectionless, datagram reassembly delivery method. Many connection-based transports have been tried, including modifications to the Transport Control Protocol (TCP) used on the Internet with limited success. What works best is normally a fragmentation and reassemble method that simply ensures the fragments arrived in a specific order so they can be reassembled. Delivery patterns for each packet in a message can range from seconds to days, depending on the state of the mobile. For example the user of the mobile device 24 might have received one packet of a message just as they stepped onto a plane leaving for another country. They user won't get the second packet of the message until they land many hours or days later in the new country, assuming it has a supported wireless network 120, 130, 140. (c) It should be able to accept network control messages and feedback if available. Some wireless networks will inform the wireless router 20 what is happening to the mobile device 24. These feedback messages are essential to improving the delivery experience. Control messages like: 'Mobile back in coverage', 'Mobile out of coverage', 'Mobile turned off', 'Base station is congested', and 'Network congested' are all important indicators that affect how to deliver packets to the device 24 in a network-friendly manner.

When sending to the mobile device 24, the wireless transport protocol 415 then adds the necessary network protocols 420. Some networks have proprietary network protocols, like Mobitex and Datatac, others networks like GPRS offer native TCP/IP or UDP/IP connection alternatives. Generally speaking the UDP/IP protocol is the preferred protocol for a network like GPRS, as it provides the loose coupling needed to deliver a series of packets to construct the message. The wireless network 26 then uses the network protocol 420 to route the packet to the correct mobile device 24. Once received by the mobile device 24 it proceeds to remove the network protocol 420, the wireless transport protocol 415 and the protocol for the wireless router 405, to get at the payload 400. If necessary, the mobile device 24 will respond over the wireless transport 415 to acknowledge reception of the packet. If requested in a network like GPRS, the mobile device 24 will also open a PDP Context and acquire an IP address so that data can be sent to the device from the wireless router 20. In the end, the correct use of these protocols makes the wireless router 20 a perfect abstraction and wireless tool for connecting host services 28, 100, 102 to a community of mobile devices 24.

In the other direction when the wireless router 20 receives a packet from the mobile device 24 it preferably first strips off the network protocol 420 and retains the mobile device 24 identifier. If not already present the wireless router 20 places the mobile device 24 identifier into the source field of the protocol for the wireless router 405. Next it removes the wireless transport protocol 415 and performs any necessary acknowledgments needed. It then reads the Host Service Id from the destination field of the protocol for the wireless router 405. It packages at least the original data 400 and the protocol for the wireless router 405 into the point-to-point delivery protocol 410, and then the packaged data is delivered to the host service 28. The host service 28 removes the point-to-point protocol, and sends back an acknowledgement if necessary. The protocol for the wireless router 405 is examined for control sequences, host names and the mobile device 24 identifier. The original data 400 is then passed to the correct host service 28a, 28b, 28c or 28d using the Host Service Id and the host service name if present.

Figure 10:
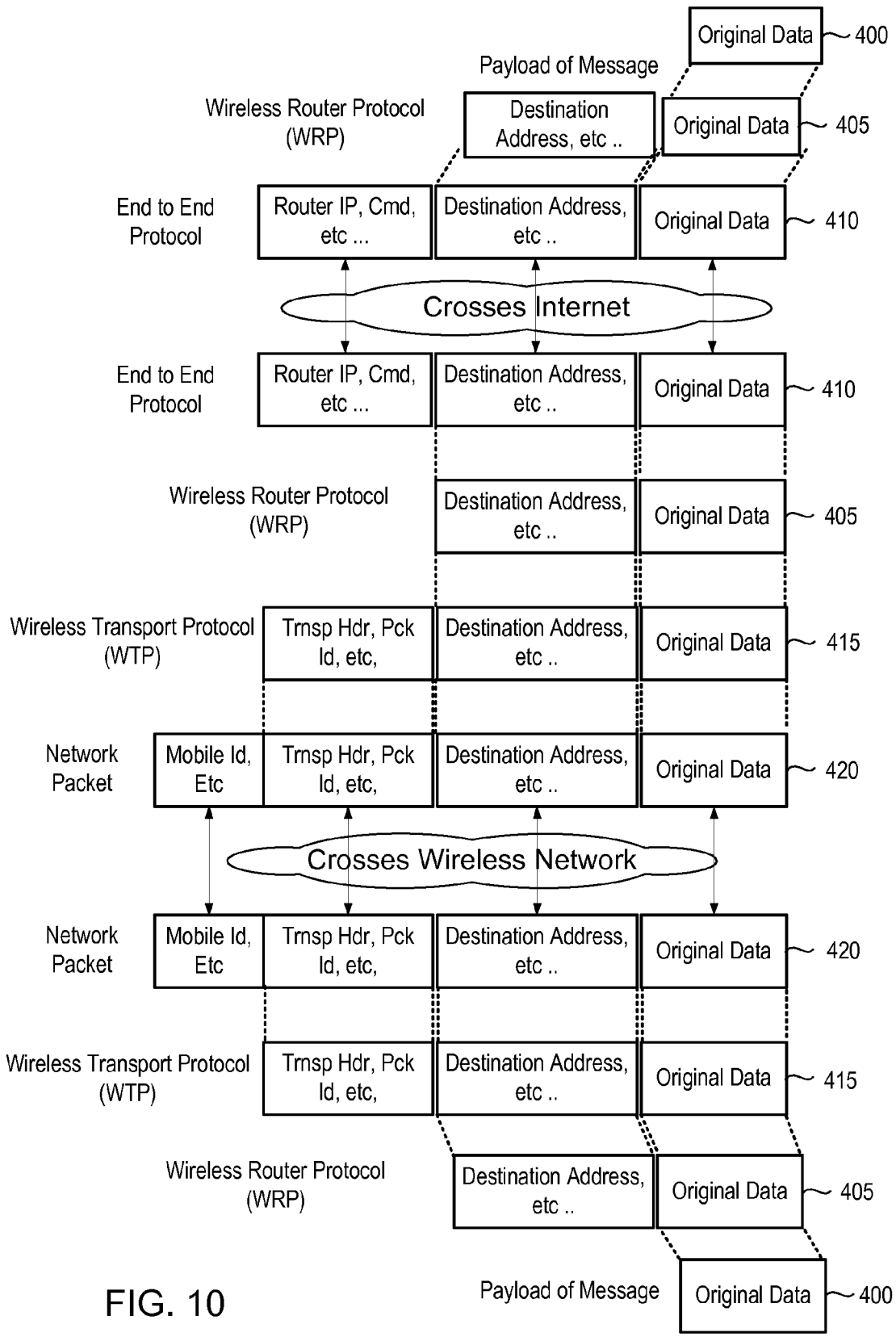
FIG. 10 is a protocol layering diagram showing how each protocol layer fits into the corresponding protocol layer.

Turning now to FIG. 10 this illustration presents another variation of the protocol layers that are used with the wireless router 20. This traditional view shows how each protocol layer fits into the adjacent layers. Starting from the host service (top of the diagram) the original data 400 is the reason for the message to be transmitted. A message is then constructed from the original data and a wireless router protocol (WRP) 405. The WRP 405 contains at least a destination address (a mobile device 24 identifier) when it is leaving the host service 28. Another message is then constructed that contains the original data 400, the WRP 405 and an end-to-end protocol 410. The end-to-end protocol 410 contains at least a wireless router 20 address (an IP address when using TCP/IP for the data connection method) a command sequence and a message length. The command sequence would be commands like 'data', 'acknowledgement', 'flow on' or 'flow off'. This message is then sent over the land-line network connecting the host system 28 to the wireless router 20, shown in FIG. 10 as the Internet.

The wireless router 20 then will remove the end-to-end protocol 410 and is left with the WRP 405 and the original data 400. A new message is constructed that contains the original data 400, the WRP 405 and the wireless transport protocol (WTP) 415. The WTP 415 contains at least a transport header command, a packet Id, a packet sequence and a total message length. The transport command would be at least commands like: 'data', 'acknowledgement', 'error' and 'resend'. Another new message is then constructed from the original data 400, the WRP 405, the WTP 415 and the network packet 420. The network packet 420 contains at least the destination mobile identifier, and other components required by the network. If the Internet Protocol (IP) is being used then the destination mobile identifier would be the currently assigned IP address for the mobile device 24. This message then travels across the wireless network 26 to the mobile device 24.

When the mobile device 24 receives this message it removes the network packet 420 and is left with the original data 400, the WRP 405 and the WTP 415. Next the mobile device 24 then removes the WTP 415 and performs any acknowledgement required by the WTP 415. Finally the wireless device 24 removes the WRP 405 and is left with the original data 400. In the opposite direction the say steps occur except that the destination address in the WRP 405 is the Host Service Id as defined earlier. The Host Service Id is exchanged with the mobile device 24 so that it has a method of addressing the host service 28.

In reference to FIG. 5 this illustration focuses on the host interface handler (HIH) 300, and its operation within the wireless router 20 to produce the features being claimed by this application. The HIH 300 is responsible for accepting connections and exchanging data between the host services 28 and the wireless router 20. The HIH also validates the initial host connection to ensure that another computer is not impersonating the host service 28. The HIH 300 also is involved with routing traffic to the correct wireless transport handler (WTH) 306 for delivery to the correct mobile device 24.

Turning now to FIG. 5 the first component shown is the firewall 110, now represented by one or more Cisco routers. For one skilled in the art it is clear that there could be many ways to implement a firewall 110, and a Cisco router offers good speed and cost performance. For the sake of this diagram the Cisco router is labeled a local director 330, as it directs incoming TCP/IP connections to the appropriate HIH 300, based on load balancing and traffic requirements. At this level the Cisco router confirms that the IP address comes from a known Host Service 28 and allows the connection through to the HIH 300. The next step is for the host service 28 and the HIH 300 to perform a security exchange of keys using standard Internet methods. One method that can be used is the SSL (secure socket layer) connection method. Another method would be to use an HMAC mechanism for message authentication using cryptographic hash functions. HMAC can be used with any iterative cryptographic hash function, e.g., MD5, SHA-1, in combination with a secret shared key. This method provides strong cryptographic and also provides good authentication as there is a shared secret key that is exchanged. The goal is to ensure that another host service 28 doesn't take over an incorrect host connection and receive their traffic. Whatever the method is used, the HIH 300 assigned to accept this host service 28, would authenticate, confirm and register the Host Service Id assigned to the connecting host service 28. In this system each host service 28 is assigned a Host Service Id, as a way to identify and route information to them. In other words the wireless router runs a simple Dynamic Host Control Protocol (DHCP) where the host names can be input manually by the operator of the wireless router 20, or they could be entered through a secure web site. The steps of authentication, confirmation and registration happen within the wireless router 20 through the Known Host Database 340a that is also accessible from the network backbone 314. The known host database 340a, working in conjunction with the work dispatcher 302, will become aware of the host service 28 to HIH 300 assignment. This assignment is then placed in the Known Host database 340a so it can be used whenever necessary for message delivery and routing. If there are any problems with either end of the connection, the work dispatcher 302 can re-assign the connection to ensure continuous host service 28 support. Both the known host database 340a and the work dispatcher 302 are mirrored in operation to provide greater fault tolerance in the system. Once the connection is established a two-way, bi-directional pipe is established that allows for data exchange with any number of mobile devices 24. As shown the known host database 340 will contain at least the host name, the Host Service Id, security information used when establishing a communication link, and the currently assigned HIH 300 if there is any. For one skilled in the art of data communications there might be advanced parameters in the known host database 340a for the state of the host service 28 connection, i.e. whether it is flow controlled or not. There could be other parameters indicating the number of outstanding messages from the host service 28, the length the connection has been established, and the owner or company of the host service 28.

After the data path is established the host service 28 can send data to mobile devices 24 as needed, without solicitation or being requested by the mobile device 24 user. For each message that arrives to the wireless router 20, it is tagged, saved and given to a WTH 306 for delivery. The work dispatcher 302 again turns to the database 340, this time looking at the mobile device 24 identifier, the mobile's status and mobile's location to determine which WTH 306 should be assigned the task of delivering the message. Different WTH 306 are assigned different networks types and countries, so these factors are also taken into account when the mobile's status and characteristics are checked. The mobile device 24 identifier in the destination field of the protocol for the wireless router 405 will indicate what network type is appropriate for this message. Once the assignment is made, the HIH 300 is informed so that it can cache the information for future data exchanges with this same mobile device 24. By keeping a cache of these assignments, the number of database hits is kept to a minimum and the work dispatcher 302 does not become the bottleneck of the wireless router system 20. During this process the billing component will be given billing records including fields like: the host name and Host Service Id, the connection time of the host service 28, the number of messages and their sizes exchanged, the types of services being accessed, the times of all data exchanges and any other relevant data that could affect billing information.

As messages are delivered to mobile devices 24 it is up to the WTH 306 to inform the HIH 300 of the completion. This allows the HIH 300 to send a final confirmation to the host service 28, if it is supported over the interface being used, and allows the original message to be removed from the mobile database 340b as having been delivered to the mobile device 24.

As shown in FIG. 5 the mobile database 340b has many fields, and it has at least fields that identify the mobile device identifier, the network type of the device, the physical connection number, the current state, the data status and an array of data items that might be pending or unacknowledged. The physical connection number is used when more then one link is available to a specific wireless network 26. Some networks impose requirements for traffic flow into the network to load balance the system. The Mobitex network in the US has just such a restriction and has sub-divided its network into regions to improve delivery. The mobile database 340b will be discussed further in FIG. 6.

In the other direction as mobile device 24 messages come up from the WTH 306 they are saved in the mobile database 340b and passed up to the correct HIH 300. If the very first message in either direction comes from the mobile device 24, the WTH 306 can ask the work dispatcher 302 where to find the host service 28 that belongs to this message. This routing technique is possible because the mobile device 24 places the Host Service Id in each message it sends to aid in the routing of the messages to the correct host service 28. This is important because one user working at one mobile device 24, could have access to many host services 28a, 28b, 28c and 28d through the same wireless router 20. If for some reason the host service 28 has not connected yet, the message waits in the mobile database 340b for some configured amount of time for the host service 28 to reconnect. The host service 28 might have had a temporarily failure, the Internet link might have drop the connection momentarily, of the host service 28 crashed and is coming back to life. Once the host service 28 is confirmed the message is then routed to the correct HIH 300, where it is routed to the host service 28. Once it is confirmed the message is deleted from the mobile database 340b. After this route is established between the WTH 306 and the HIH 300, it is kept in a cache to reduce the number of database hits. During this process of message delivery from the wireless device 24 to the host service 28 a billing record is written to the billing component so that a record is kept of all data exchanges, the time of the exchange, the network it originated on and any other pertinent information needed for billing the customer or the user.

Another routing method offered by the wireless router 20 is the ability for mobile devices 24 to send directly to each other without involving an external host service 28. In certain circumstances, a user of a mobile device 24 may wish to send a data item directly to another mobile device 24 associated with the same wireless router 20, without sending the data item to a host system 28. This is a common technique used in Instant Messaging systems and is very popular in desktop host systems. The peer-to-peer messaging component 304, in the wireless routing system 20 in FIG. 5 enables such communication between mobile devices 24. If a data item is to be sent from the mobile device 24a to the mobile device 24b for example (not shown), then an identifier for the mobile device 24b is inserted as a destination address of the protocol for the wireless router 405. The data item is then sent to the wireless router 20, which recognizes the destination as a mobile device 24 identifier, instead of a Host Service Id. In one embodiment of the invention, the data item is an E-Mail message that would use an SMTP address as the destination. If the data item address contains an '@' symbol, then the data item would be destined for a host service offering an E-mail service. Where a wireless network address or identifier, such as a MAN (Mobitex Access Number) or NET ID (a Datatac Host Id) for example, appears as the destination address however, the Peer-to-Peer Messaging component 304 recognizes the message as a peer-to-peer message.

Under control of the peer-to-peer messaging component 304, the wireless router 20 sends the data item back through the wireless router 20 to the mobile 24b, instead of through one of the host services 28. The data item is thus forwarded to the mobile device 24b without having been sent to a host service 28 associated with the mobile device 24. Such functionality is particularly useful for example when the user of mobile device 24a is aware that the user of device 24b is not at the location of the host system 28. When the destination mobile device 24b is out of wireless network coverage, the wireless router 20 stores the data item to the mobile database 340b for delivery to the mobile device 24b when it returns to a coverage area of the network 26.

Figure 6:
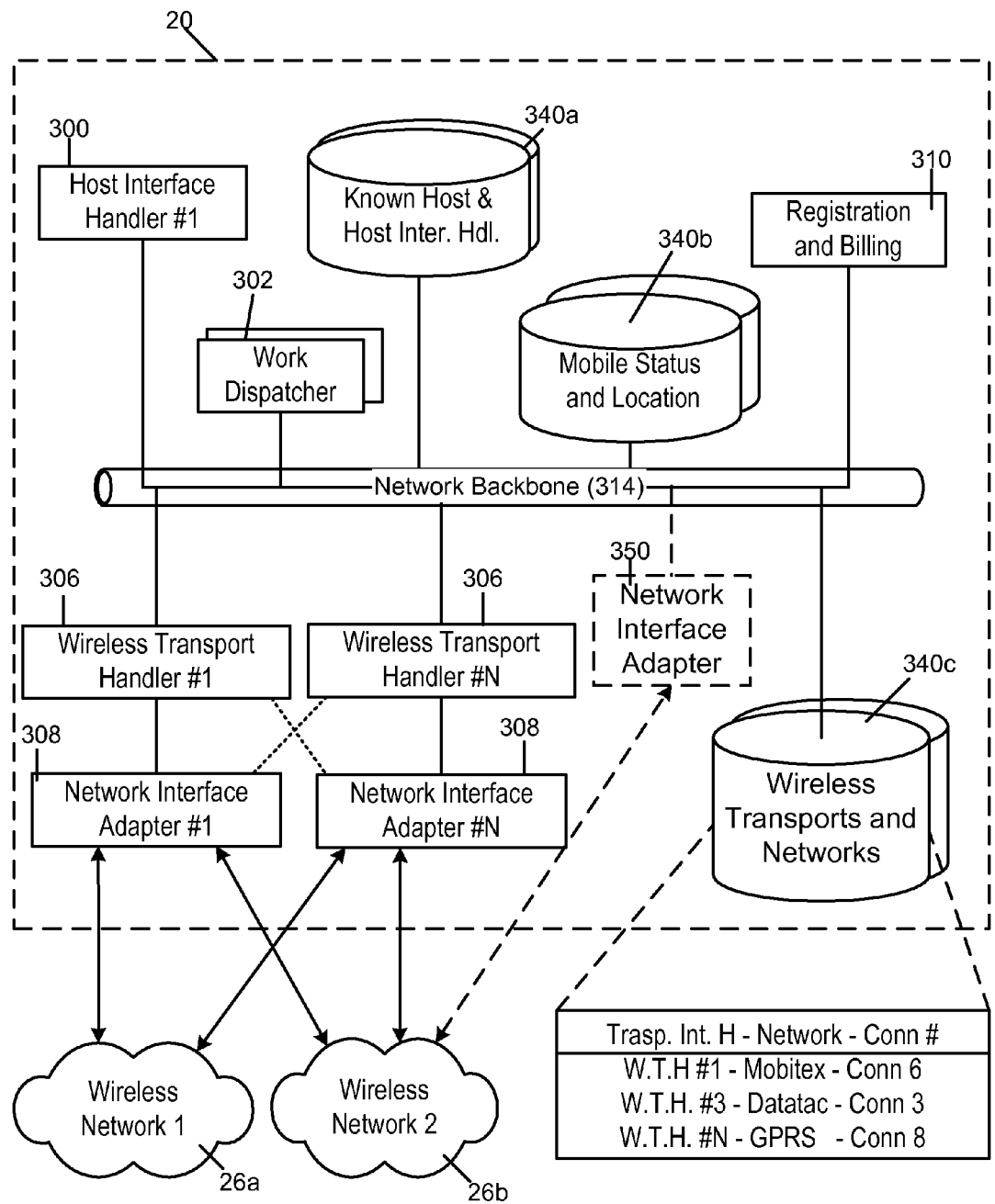
FIG. 6 is a detailed diagram of the wireless transport and network interface adapter components within the wireless router. These components ensure the delivery of data, perform packetization functions and track the location of the mobile in different parts of the world.

In reference to FIG. 6 this figure focuses on the role of the wireless transport handler (WTH) 306 and the network interface adapter (NIA) 308 in the role of delivering and receiving data to a wireless network 26. As demonstrated in FIG. 5 the role of the work dispatcher 302 and the mobile database 340b are key to providing the routing operation required. In FIG. 6 another database is introduced the wireless transport and networks database 340c. This database holds the relationship between WTH 306 and wireless networks 26. Since one wireless router 26 supports any number of wireless networks 26, this is done by mapping wireless networks 26 onto different WTH 306 components.

Turning now to FIG. 6 we can build on the description provided in FIG. 5. For data arriving from a host service 28 there is an assignment made to a WTH 306. This assignment was briefly in FIG. 5, and was based on many factors. When the wireless router 20 was first built, there was an attempt to mirror every component to have at least one redundant element. In the case of the WTH 306, the work dispatcher 302 will have several WTHs 306 that can reach the same wireless network 26 and provide redundant service. Therefore, in addition to finding the correct WTH 306, that can provide access to the correct network, the work dispatcher 302 ensure the WTH 306 does it's job. If the WTH 306 has a problem, is overloaded, or some other problem exists, it will re-assign the message to another WTH 306 if the first one fails for some reason. To assist the work dispatcher 302 the wireless transport database 340c keeps track of all the WTH 306, the wireless network 26 they support, their roles and their capabilities. Each WTH 306 might talk to one or more NIA 308. The NIA 350 might be accessible direction or via the network backbone 314. This architectural decision is based on how closely coupled the NIA 308 will be with the WTH 306. A closely coupled system means the two components can be optimized and improved to improve performance and throughput A loose coupling means that if an NIA 350 fails it is easier for the WTH 306 to acquire a new NIA 350 to serve the same purpose. In the loose coupling embodiment the WTH 306 would request a NIA 350 that connects to a given network via the work dispatcher 302. The work dispatcher would go to the transport database 340c to find an assignment of NIA 350 to wireless network 26 mappings. The wireless transport and networks database 340c has a range of fields to provide the functionality necessary for the wireless router 20. The transport database 340c has at least the following fields: WTH number, the network that it is supporting and the connection number identified. Each WTH 306 can support many links to NIA 308 and thus to many wireless networks 26.

As part of the functionality offered by the wireless router 20, the WTH 306 is responsible for some very major elements. Specifically its goal is to ensure that messages are broken into network packet sizes and that each packet of a given message arrives to the destination. Although this sounds easy, and there have been many transports written before this is especially hard in a wireless network 26. For example the authors of this application have created seven such transport layers over the past 10 years, each having different properties and methods for achieving the goal of guaranteed message delivery. This application is not claiming the implementation of a wireless transport layer, instead it is the synergy of a wireless transport layer along with all the other components of the wireless router 20 that create a solution bigger then their individual parts.

Once the message has been broken into packets the WTH 306 selects the correct NIA 308 to deliver the message. Each NIA 308 might have connections to many networks, and different NIAs 308 might have redundant links so that NIAs 308 are fault tolerant. The WTH 306 saves the state information of each mobile device 24 in the mobile database 340b and in a local cache known as the location database. This state information informs the WTH 306 whether the device 24 has packets still pending, what the last delivery times were like and the last known NIA 308 (network link) the device 24 was reached over. All this information makes it possible for the WTH 306 to provide the best possible ability to track and reach the device 24. To complement this the wireless router 20 also provides the ability to push information to the wireless device 24 without the wireless device 24 user having to perform any action whatsoever. This ability is implemented either within the WTH 306, or in conjunction with the NIA 308. For example in the GPRS network, which is a data overlay on the GSM network, the NIA 308 implements a SMS-ping method to ensure the mobile device 24 always has a PDP context activated and thus is assigned an IP address. The NIA 308 also is capable of monitoring DHCP traffic to know when IP addresses are assigned or unassigned to mobile devices 24, also enhancing the ability of the wireless router 20 to track the mobile device 24. These entire enhancements provide an excellent message delivery experience for the mobile user 24, and it requires all the component working together to provide the end-user experience required to make the wireless router 20 an essential component of the wireless delivery and acknowledgement experience.

In reference to FIG. 7 this illustration focuses on the billing and registration aspects of the wireless router 20. These components provide support functions within the wireless router 20 to further strengthen its abilities and features. As already discussed, the registration and billing services 310 is a discrete task that accepts bill records from one or more other wireless router components and preferably builds and maintains a billing database 340e (not shown). The billing records might come as UDP broadcasts, or through some special TCP channel to the billing component. Using a TIBCO information bus, the publish/subscribe model can be used very effectively for building billing records. The registration component 310 provides the ability to register new host services 28 and to register the movement of mobile devices 24 from one network to another network 26.

Turning now to FIG. 7 there are several support services being presented for the wireless router 20 to make use of. The first of these are billing services 314, which are preferable to the tracking of data and traffic between all wireless networks and the host service 28. In this example the billing services 314 has been broken out into its own service entity. One advantage of placing the billing services 314 in the wireless router 20, is that all billing requirements across all wireless networks 26a, 26b, 26c and 26d may be aggregated into a single bill for the user or corporation. A common practice in many companies these days is to deploy a range of network solutions to their staff. Corporate workers and executives are all now commonly outfit with both cell phones and wireless PDAs to solve a range of communication challenges. Generating a bill for a single company, that has all traffic for all devices 24, on all networks 26a, 26b and 26c is a major challenge without having a wireless router 20 architecture. The billing component will allow for other components to deliver or send billing records to the billing component. Information for host-originated and mobile-originated billing messages will be defined. These billing messages preferably contain information like: name of the host service 28, the connection time of the host service 28, the number of messages exchanged and their respective sizes, the types of services being accessed, the times of all data exchanges and any other relevant data that could affect billing information. As a database of billing information is built up and refined it should be possible to bill customers using specialized billing techniques. Already common in the industry is the ability to bill based on time, on services accessed and on volume. Within the wireless router 20 similar billing scenarios can also be created for with the correct information saved a very sophisticated billing scenario can be created where the operator of the wireless router 20 charges based on issues like: 'Host Service A, when access after peek hours can be used for data exchanges of up to 10,000 bytes without charge'. For one skilled in the art, it is clear that there are hundreds of different charging profiles that could be created to the installed base with the correct billing records.

The next support element is for registration services 310. Registration services 310 are essential for registering various host services 28 and for allowing mobile devices 24 to inform the wireless router 20 as to their current location. Another advanced use of the registration service 310 is the ability to inform a newly sold mobile device 24 as to which services are available and which they already have access to. This is valuable when a mobile device travels to another country and only certain host services 28 are available from that country's wireless network. For instance, perhaps the host service 28a did not pay the extra costs of offering the service in that country, or perhaps there isn't a physical link to that wireless network. Whatever the case, the mobile device 24 has the ability to send a registration request and get a registration response from the wireless router 20. This exchange is possible because the registration service component 310 has the ability to check the mobile service and assignments database 340 to see what services have been defined for this mobile device 24. Since the registration service 310 has a major conversation role with the mobile device 24, one embodiment provides a NIA 312 directly for each registration server 310. Alternatively, the registration service 310 could also request the least busy NIA 312 from the work dispatcher 302 and use a round robin method to send and receive messages to mobile devices 24. The goal of providing the registration server 310 with their own dedicated NIA 312 is to ensure normal device traffic does not slow down or congest the ability for registration requests to be received in a timely manner.

These commands preferably permit the owner to control which host services are accessible by mobile users. In one embodiment, a secure web page requiring one or more passwords by the owner is provided and is coupled to the host interface handler 300 to permit the selection and transmission of such commands.

The operation of the wireless routing system 20 is further illustrated in the flow diagrams in FIGS. 9(*a*), 9(*b*), 9(*c*), 9(*d*) and 9(*e*). As shown in FIG. 9(*a*), the wireless routing 20 is normally in a waiting state designated S800. When a message or signal is received, the type of message or signal is then determined in steps S802 through S808. The determination at step S802 that a network control message has been received, i.e. something like a network coverage message. These aspects of coverage are detailed in FIG. 9(*b*) labeled 'B', shown in step S820. The wireless router 20 uses network features and facilities, when available, to enhance the delivery experience and build up a better wireless transport layer. The next test is to determine whether a network data message S804 was received. Since we don't have a network control message S802 the message could be a data message from the mobile device 24. If not a network data message S804 it could be a data item send from the host service S806. If the message is not a data item sent form the host service S806 it could be a registration message S808. If it is not any of these then it could be an unknown message, or a message that is not dealt with in this application S854 and in this case we return to the wait state to wait for more messages or signals S856.

If the message is a network data message S804, then it could be a wireless transport control message S822 or an actual data message S826. If it is a wireless transport message the flow chart expands in FIG. 9(*c*) S824. Otherwise if the message is actual data for the host, the wireless router 20 tries to confirm that the destination host is known and currently connected S828. If the host is not currently connected the information is saved in the database 340 to wait for the host to reconnect S832. If the host is present the information is passed up to the host following the logic described in earlier figures S830.

If the message is a data item from a host service S806 then a further test is performed to see if the message is a point-to-point control message S842 or it is actual data S844. For both cases, the flow chart continues on FIG. 9(*d*) S842 & S844. If the message is a registration message S808 the first step is always to confirm the device's registration by re-registering the device S850, then the flow chart continues on FIG. 9(*e*).

Turning now to FIG. 9(*b*) this represents the flow chart to handle network control messages within the wireless router 20. There could be a wide range of network control message, depending on what is supported in the target wireless network, this data flow win show some of the most common messages and their side effects. If the device is entering coverage S860, is leaving coverage S864 or the device is congested S866, they all confirm that the device is known and registered S870. If the device is not known S872 the signal is ignored and the wireless router returns to wait for more messages or signals (A). Otherwise the current location is updated S874, and depending on the type of signal a branch is taken. If the signal was that the device was entering coverage S860, the database entry for this mobile is marked to indicate that it is capable of receiving data again S876. In this case all pending data is sent following the transport rules to govern the transmission of data. If the signal was that the device has left coverage S862 the database entry for this mobile is marked to indicate no coverage and any data transmissions to the device are stopped S878. If the signal was that congestion was occurring to the device S866 or to the base station supporting the device, then the database entry for this mobile is marked as congested and aggressive back-off and pacing is preformed S880. Once the database is modified and the transmission is affected the wireless router 20 returns to the waiting state (A).

If the problem is more serious and the network is congested S866 then a global pacing algorithm is employed to reduce the dataflow through the NIA 208 supporting that link S882. Then the wireless router returns to wait for additional data or signals (A). If it is not of these signals it could be another minor signal not examined here S868. In this case the signal is processed and the wireless router returns to wait for more data (A).

Figure 9A:
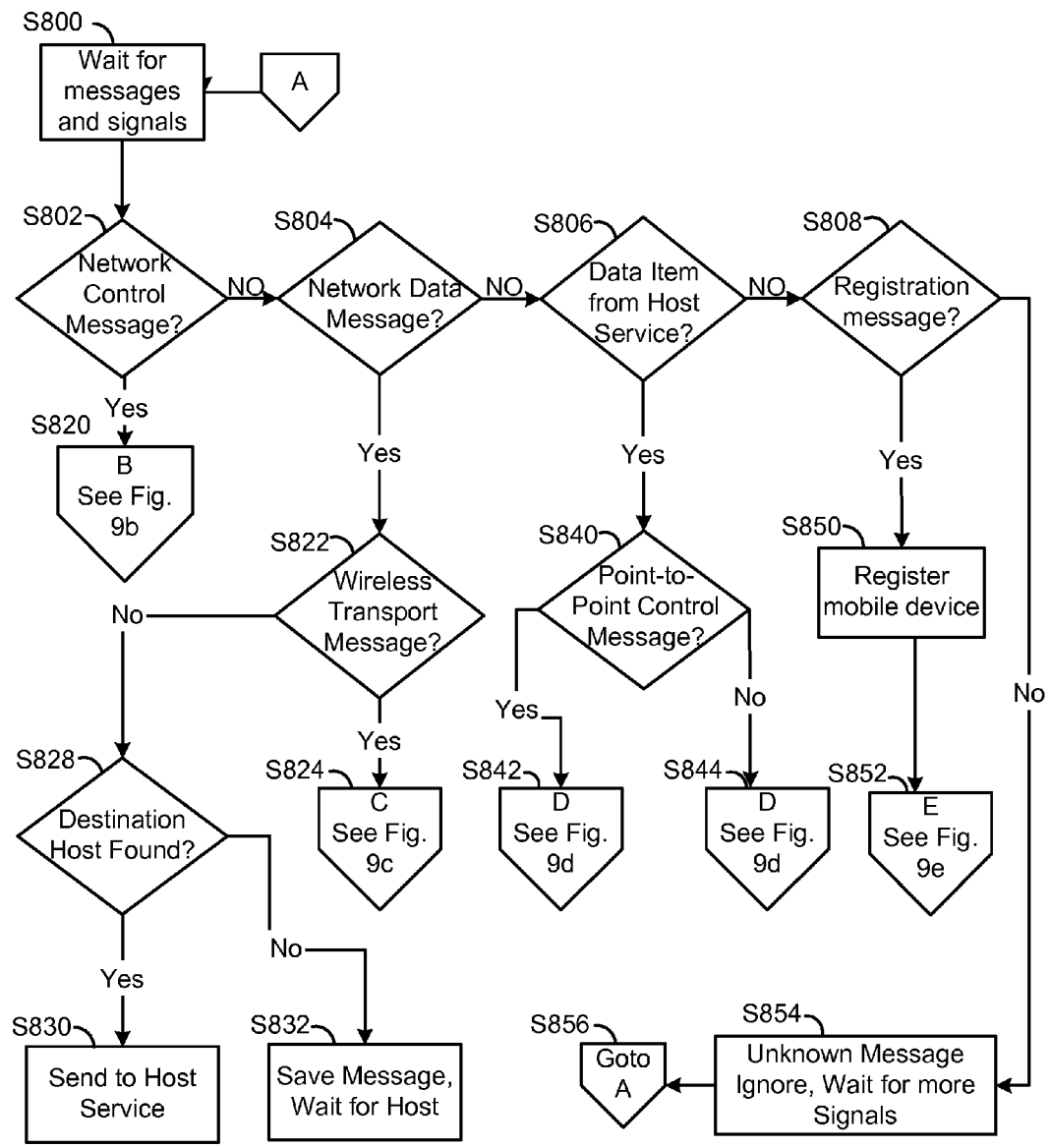
FIGS. 9(a), 9(b), 9(c), 9(d) and 9(e) show a flow diagram of a routing method according to an aspect of the invention.
Figure 9B:
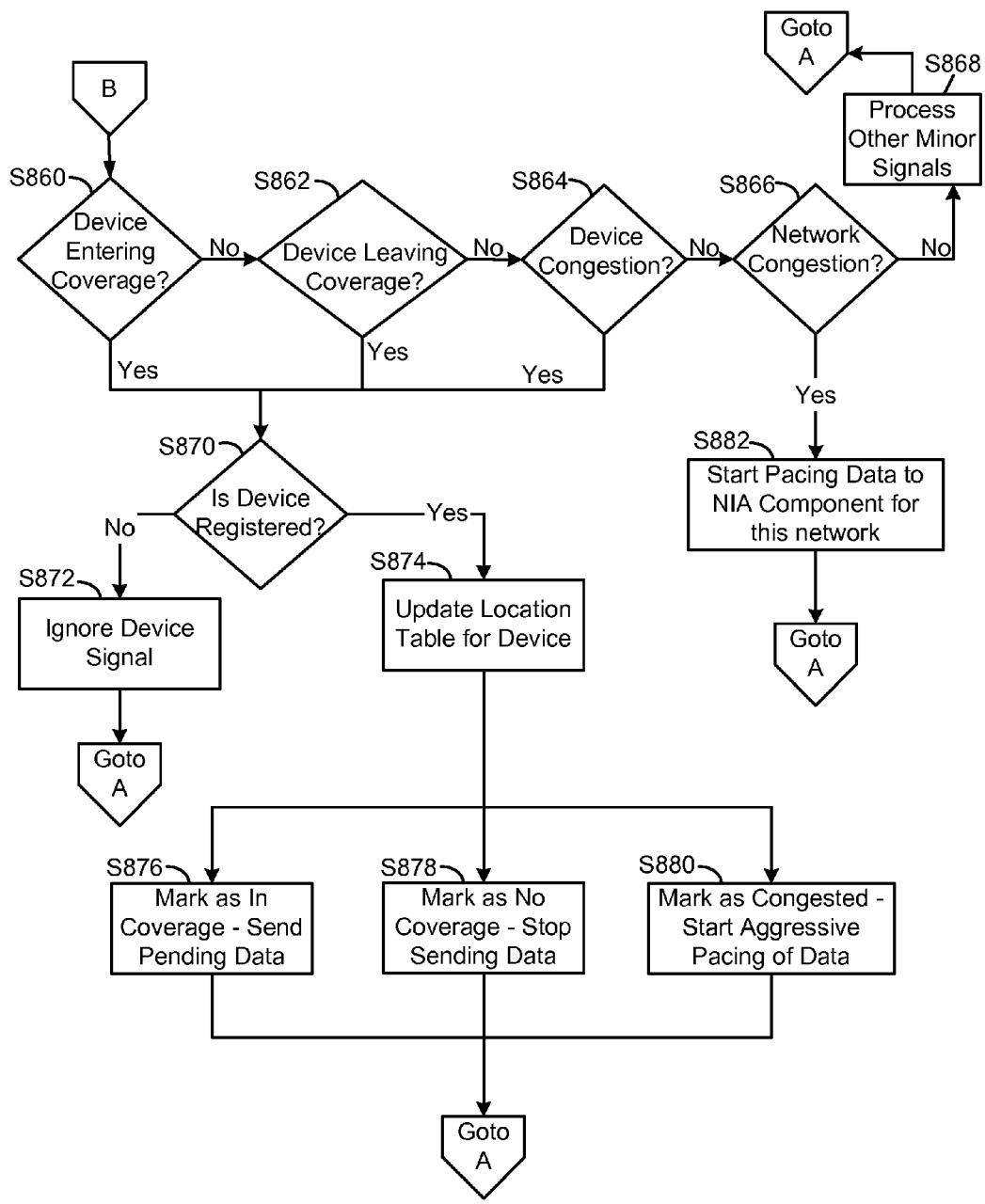
Figure 9C:
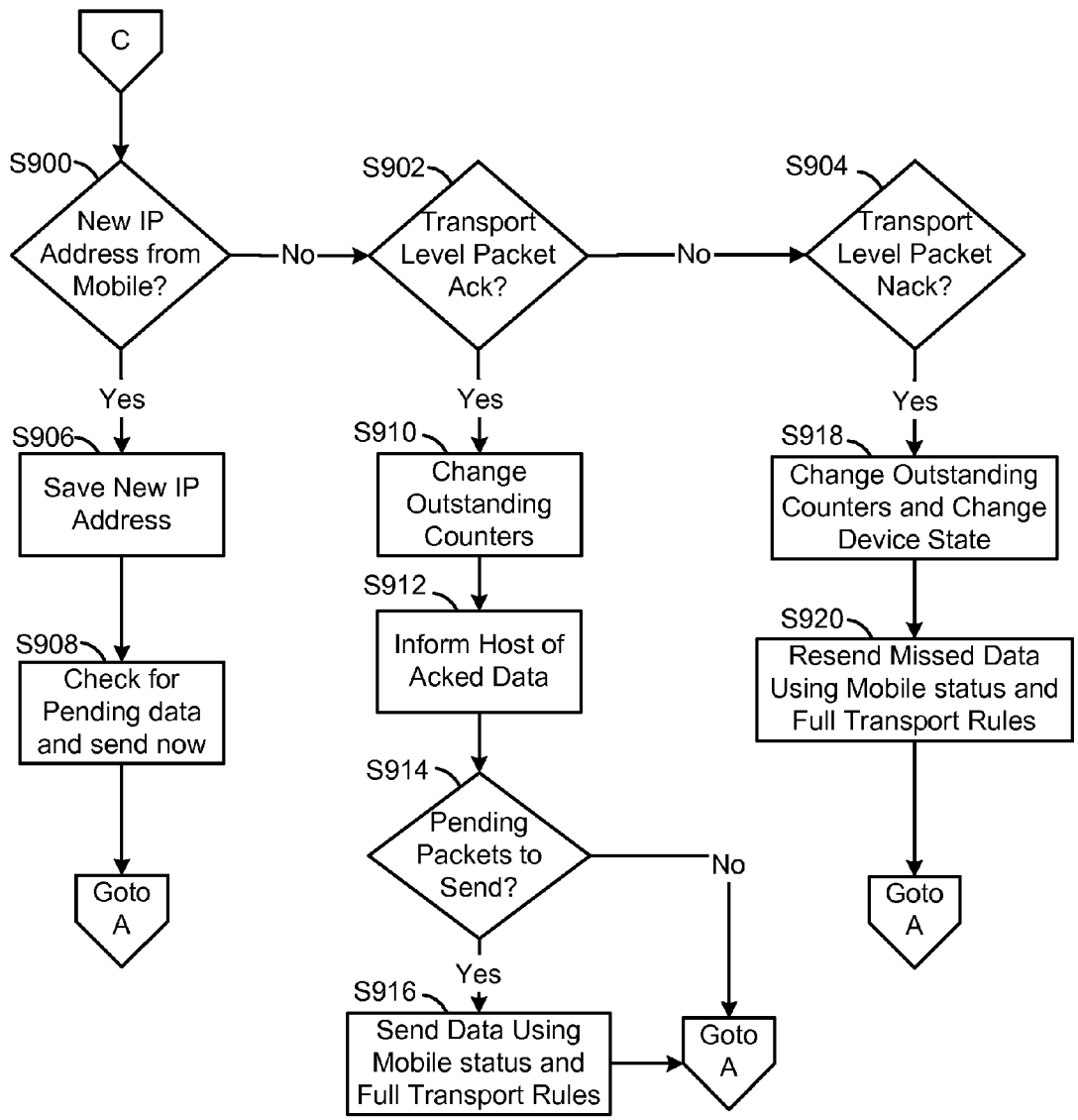

Turning to FIG. 9(c) this represents the processing needed when a new transport control message arrives. The first step is to see if the message is registering a new IP address for a mobile device S900. This can take place when the wireless router sends a request to the device to acquire an IP address, or when the device spontaneously acquires an IP address. In this situation the new IP address is saved S906 and the database is checked to see if any pending data exists for this mobile device S908. If there is data the data is sent following the normal transport rules. If the signal was a transport level packet acknowledgement S902, then the current outstanding packet counters must be changed S910. Once these values are adjusted the wireless router will inform the host of the acked data S912, so the host can purge the data from its pending queues. Then a test is performed to see if any packets are pending for the mobile device S914. If so they are sent using the mobile's current state, and following the full transport rules S916. If there is no data the wireless router returns to wait for more messages or signals (A). Finally if the signal was a transport level packet negative acknowledgement S904 the software will again change the outstanding counters S918. The software will also change the device state to indicate the failure and if the failure continues the device might be marked out-of-coverage. Any missing data items are then resent using the mobile's new status and the full transport rules for message delivery S920. When this is done the wireless router returns to wait for more messages or signals (A).

Figure 9D:
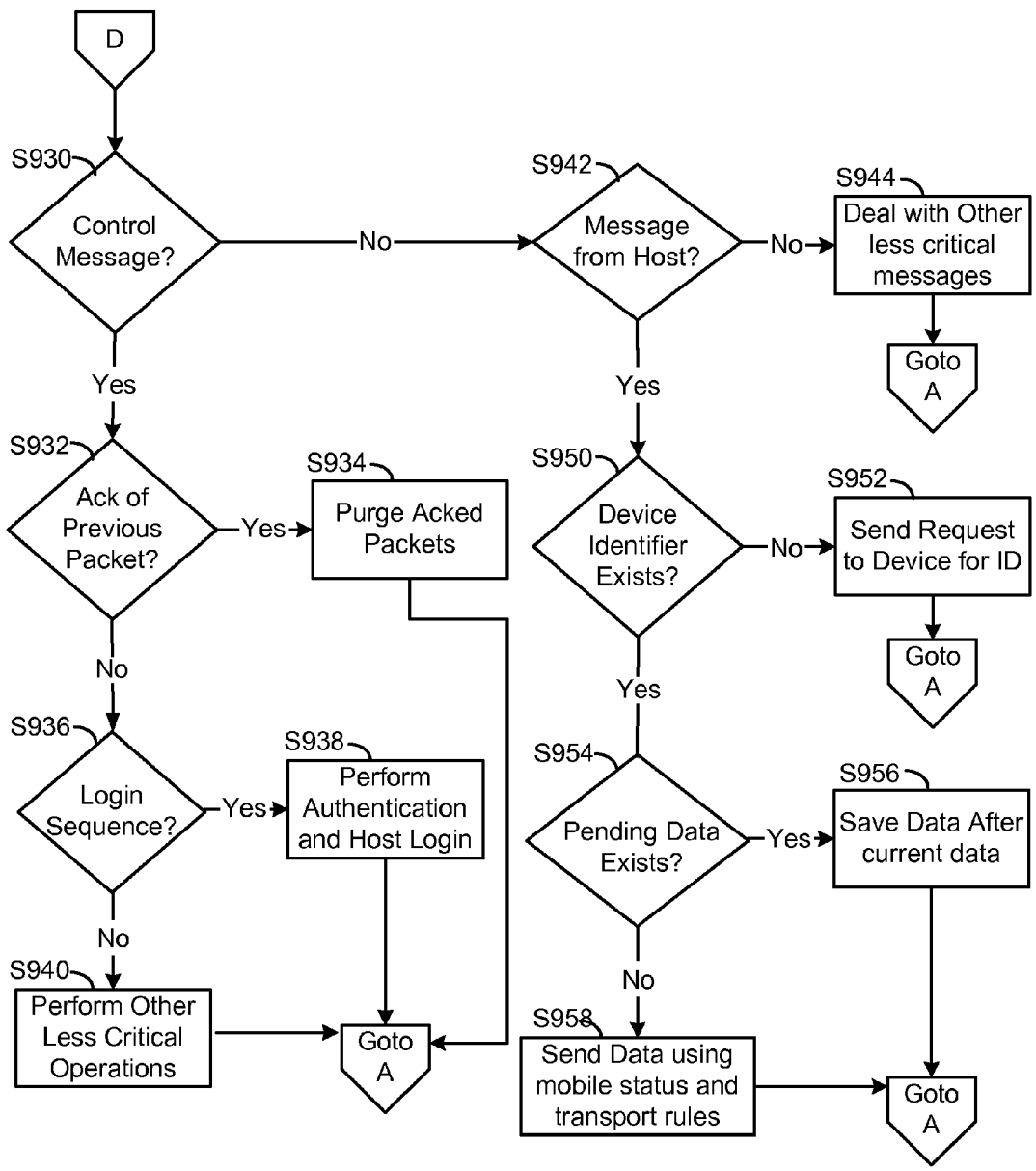

Turning now to FIG. 9d this data flow diagram shows the high-level processing performed on data items from the host service. The message from the host could either be a control message or a data message. The first test is to determine which of the two types of messages have been received 930. If it is a control message, the first type of control message checked for is a previous acknowledgement for information sent to the host S932. If an Ack was received then the wireless router 20 can purge any data waiting for this confirmation S934. If the packet was not an ack perhaps the host service is completing the login sequence and is authenticating and getting fully connected S936. If this is the login sequence taking place the full login is completed and the host is registered S938. Otherwise there could be other less critical control sequences not directly presented in this application S940. In all case the software returns to wait for more signals or data (A).

If the message was not a control message then the host may be trying to send data to a mobile device 24. To verify that this is host data a test is performed on the message to confirm its header message type and format are accurate S942. This includes a test on the destination mobile address to confirm that it is valid. If the device identifier is missing, malformed, invalid or the user's device is in some kind of error state (bills have not been paid), then further checks are performed on the message. If the message is something other then data, or if the format is not recognized, S944 the wireless router might try to perform some other operations that are less critical S944. Once this is done the software returns to wait for more messages or signals (A). The next step is to verify that the destination mobile device has an address at the moment S950. For one skilled in the art it will be remembered that it is possible for the mobile device 24 to have lost its IP address assignment due to an extended idle period. If the mobile device 24 does not have an identifier, like an dynamic, private IP address as used in GPRS, then the device will send off a request to the device to acquire the address S952. This will cause the device 24 to open a PDP context in GPRS and acquire a new IP address. Once this request is made the software goes back to wait for more messages and signals (A). If the device does have an identifier the software checks to see if any other data is pending to this device S954 and if so it will save the new data after the current data S956. Then it will return and wait for more messages and signals (A). If there is no other data pending the software will send the data following the mobile's status and using the full transport layer protocols for delivering the data S958. Then the software returns to (A) to wait for more messages and signals.

Figure 9E:
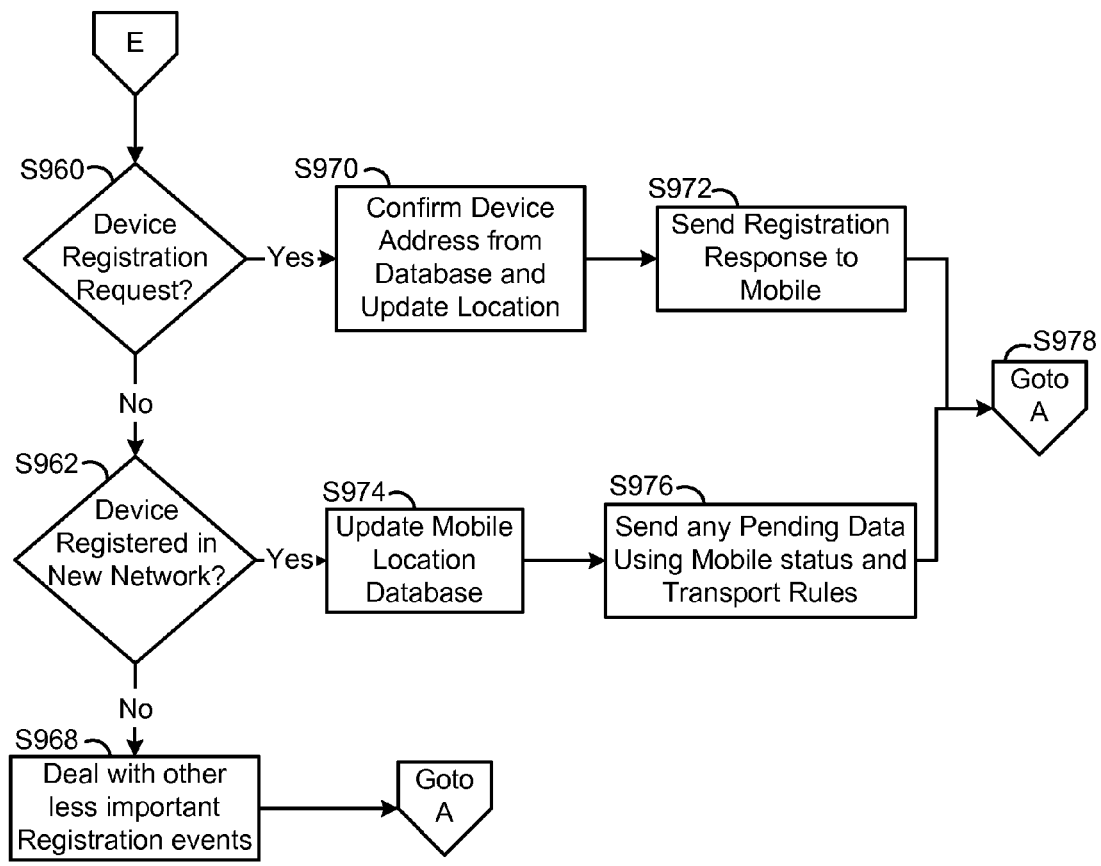

Turning now to FIG. 9e there is a data flow diagram for registration events that can occur within the wireless router 20. The first step is to determine what type of registration event has taken place. The first test is to see if the device has sent a formal device registration request S960. This formal requests causes a full Registration Response to be returned that contains all valid services for the mobile device S970. The wireless router 20 also takes this opportunity to mark the position of the device in the position database S970. After this the registration response is physically sent to the device over the wireless network S972. The software then returns to wait for more messages or signals (A). The device might also be sending a registration signal indicating that it has moved to a new network, and/or country S962. If this is true then the mobile location database is updated S974 and any pending data is transmitted to the mobile following its status and full transport rules S976. When this is complete the software returns to wait for more messages or signals (A).

If there are other registration services they are lower priority and not handled in this application S968. Once handled the software returns to wait for more signals and data (A).

Having described in detail several preferred embodiments of the present invention, including preferred methods of operation, it is to be understood that this operation could be carried out with different elements and steps. It will be appreciated that the above description relates to preferred embodiments by way of example only. Many other variations of the invention will be obvious to those knowledgeable in the field, and such obvious variations are within the scope of the invention as described and claimed, whether or not expressly described.

For example, routing system functions may be distributed differently than described above according to the second embodiment Further routing functions may possibly be distributed to additional distinct functional components, to improve scalability and reliability of the invention, or separate routing functions might instead be combined and provided by common functional components. For example, where the routing system is implemented primarily in software, the wireless transport functions could be further distributed among multiple computers. Similarly, functions performed by the protocol handlers and dispatchers may possibly be combined and executed on a single computer. A system designer can determine the degree of distributed processing and the routing system can be implemented accordingly.

Although the communication links between the wireless transports and packet blasters or wireless networks can be very long-range links, it might also be preferable to provide separate routing systems for geographically distant wireless networks. For example a routing system serving the Mobitex and DataTAC wireless networks in North America could be linked with a further routing system which serves a GPRS network in Europe. This would preferably be accomplished by configuring at least one protocol handler in each routing system as a bridge component, through which the routing systems can send data items and possibly configuration information, wireless network address and subscriber information and the like.

Figure 11:
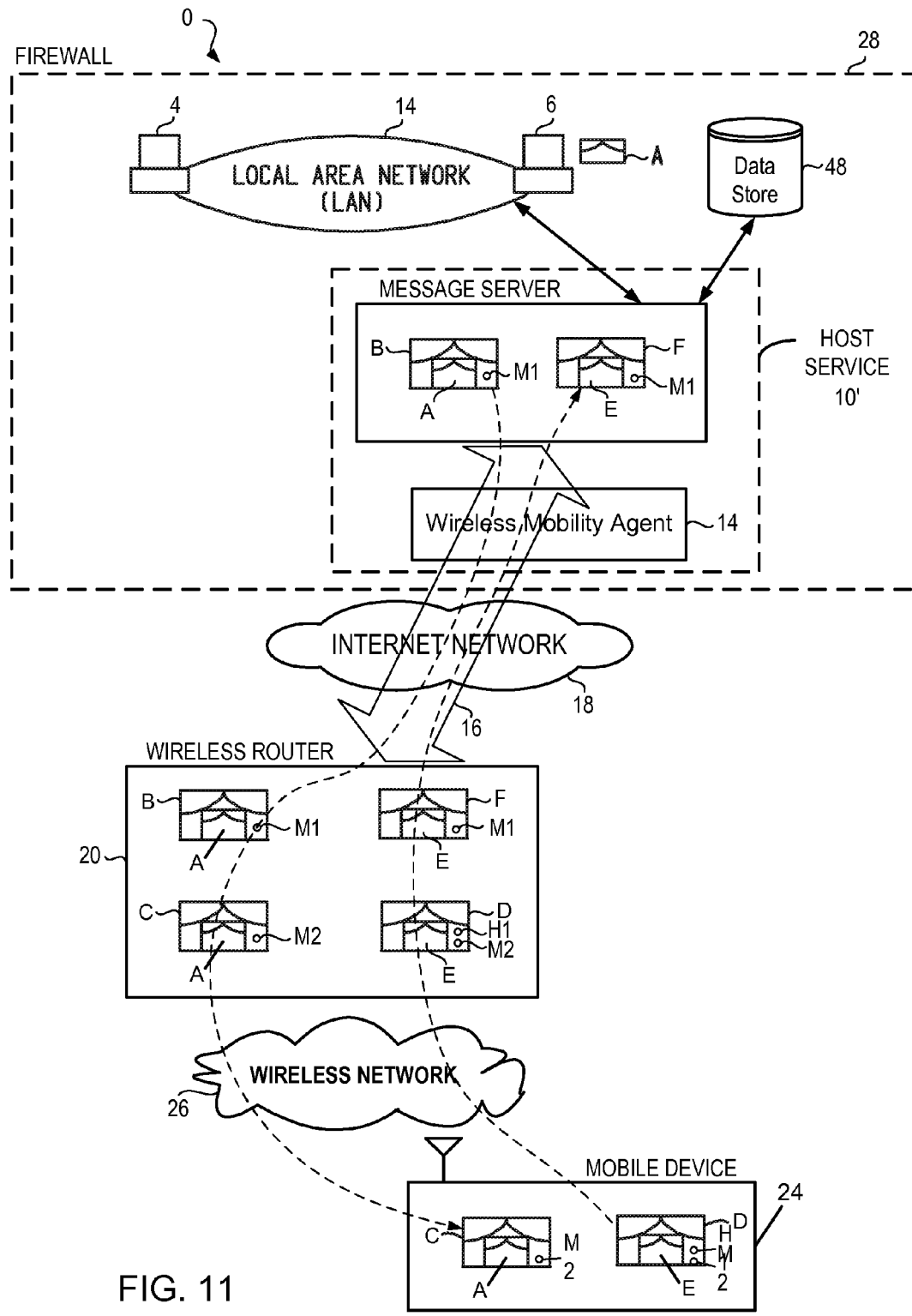
FIG. 11 is a system diagram setting forth an illustrative flow of a first data message originating from a host service and another from the mobile device.

FIG. 11 is a system diagram illustrating two examples of data flow. In a first instance, data originating from a host service to a mobile device through a common router. In a second instance, data originating from the mobile device to the host service.

In the first instance, after certain initialization steps (such as establishing the point-to-point communication 16 between the wireless router 20 and the host service 10'), a first data message (reference 'B') is sent to a wireless router 20 from a first host system 10 such as corporate enterprise computer system 28 having a first host service communicating as messages to and from a message server. The first data message includes a first payload (reference 'A') and a first mobile destination identifier (reference 'M1'). The first data message is received at the wireless router and then examined. Next, a second data message (reference 'C') is generated for transmission on a wireless network. The second data message includes the payload A, and a second mobile destination identifier (reference 'M2'). The second data message is then routed to the wireless network for eventual receipt by a mobile device associated with the second mobile destination identifier. In a preferred embodiment, the receipt of the second data message at the mobile device results in an application associated with the second data message to further process the information contained therein. In the instance where the payload is an encrypted email message, the email is decrypted and then presented to the user of the mobile device.

A second instance is now described wherein the data message originates from the mobile device. In this case, a third data message is received from the mobile device at the wireless router. The third data message includes a second payload (reference 'E'), the second mobile destination identifier (reference 'M2') and a host service identifier (reference 'H1') associated with the second payload. The third data message is examined and a fourth data message (reference F) is then generated having the second payload and the first mobile destination identifier therein. The fourth data message is then routed from the wireless router to the host service.

In one embodiment, there is provided a method to route data items between a plurality of mobile devices and a plurality of host services, the method comprising of the following steps: (a) generating a mobile data item, at a mobile device, comprising of a host service identifier; and, a data payload; (b) preparing a wireless network message containing the mobile data item by: adding to the mobile data item a wireless network protocol conforming to protocols required by a wireless network associated with the mobile device; and, addressing the mobile data item with an address associated with a wireless router; (c) transmitting the wireless network message via the wireless network to the wireless router; (d) upon reception of the wireless network message at the wireless router: removing the wireless network protocol from the wireless network message thereby recovering the mobile data item; extracting at least a mobile identifier from the wireless network message; adding the mobile identifier to the mobile data item; routing the mobile data item to a host service corresponding to the host service identifier in the mobile data item.

In another embodiment, there is provided a method to route data between a plurality of mobile devices and a plurality of message servers comprising of the following steps: (a) generating a mobile data at a mobile device comprising of: a destination identifier; and, an encrypted data payload comprising a body of an email message and addressing information for the body; (b) generating a wireless network message comprising: the mobile data, a wireless network protocol layer conforming to protocols required by a wireless network, and a wireless router address; (c) transmitting the wireless network message via the wireless network to a wireless router; (d) upon reception of the wireless network message at the wireless router: removing the wireless network protocol layer from the wireless network message thereby extracting the mobile data; adding a mobile identifier to the mobile data, if the mobile identifier is not already contained in the mobile data; routing, via the Internet, the mobile data to a message server, identified by the destination identifier, operating at a particular corporate enterprise computer system.

In another embodiment, there is provided a wireless router method for routing data between a plurality of corporations and a plurality of mobile devices, the method comprising: (a) upon reception of a wireless network message at the wireless router originating from a first mobile device via a wireless network coupled to the wireless router, the steps comprising: recovering a first mobile data item generated at the mobile device by removing a first wireless protocol network layer from the wireless network message, said first mobile data item comprising of an encrypted data payload and a corporation identifier; if the first mobile data item lacks a mobile identifier, then adding a mobile identifier to the first mobile data item; routing the first mobile data item to a first corporation from the plurality of corporations using a host service identifier in the first mobile data item; (b) upon reception of a corporate data item at the wireless router originating from a second corporation, the steps comprising: adding a network protocol layer to the corporate data item; routing the corporate data item to a second mobile device, via the wireless network, using a mobile identifier in the corporate data item.

In another embodiment, there is provided a method to route data items between a plurality of mobile devices and a plurality of host systems, the method comprising of the following steps: establishing a point-to-point communication connection between a first host system and a wireless router; generating a first mobile network message at a first mobile device comprising: a first data item having at least a data payload; a first host service identifier associated with said data payload, a first wireless router address, and a first set of network protocols, and; transmitting said first mobile network message from the first mobile device to a first wireless network in communication therewith; routing said first mobile network message from the first wireless network to the wireless router based on the first wireless router address; receiving said first mobile network message at said first wireless router; routing said first data item from the wireless router to a first host service based on the first host service identifier.

In another embodiment, there is provided a method to route data items between a plurality of mobile devices and a plurality of host systems, the method comprising of the following steps: establishing a plurality of point-to-point communication connections, wherein each host system of the plurality of host systems has an established point-to-point communication connection between the host system and a common wireless router; sending data items from each of the host systems to the common wireless router through each host system's corresponding point-to-point communication connection, wherein each of the data items includes a data payload, and a first mobile device identifier associated with said data payload; receiving the sent data items at the common wireless router; performing the following steps for each received data item: associating a particular wireless network of a plurality of wireless networks in communication with the common wireless router and a second mobile device identifier; generating a mobile network message comprising the data item and a wireless network protocol layer including the second mobile device identifier; routing each generated mobile network message to a mobile device corresponding to the second mobile device identifier through the particular wireless network associated with the mobile device.

Figure 12:
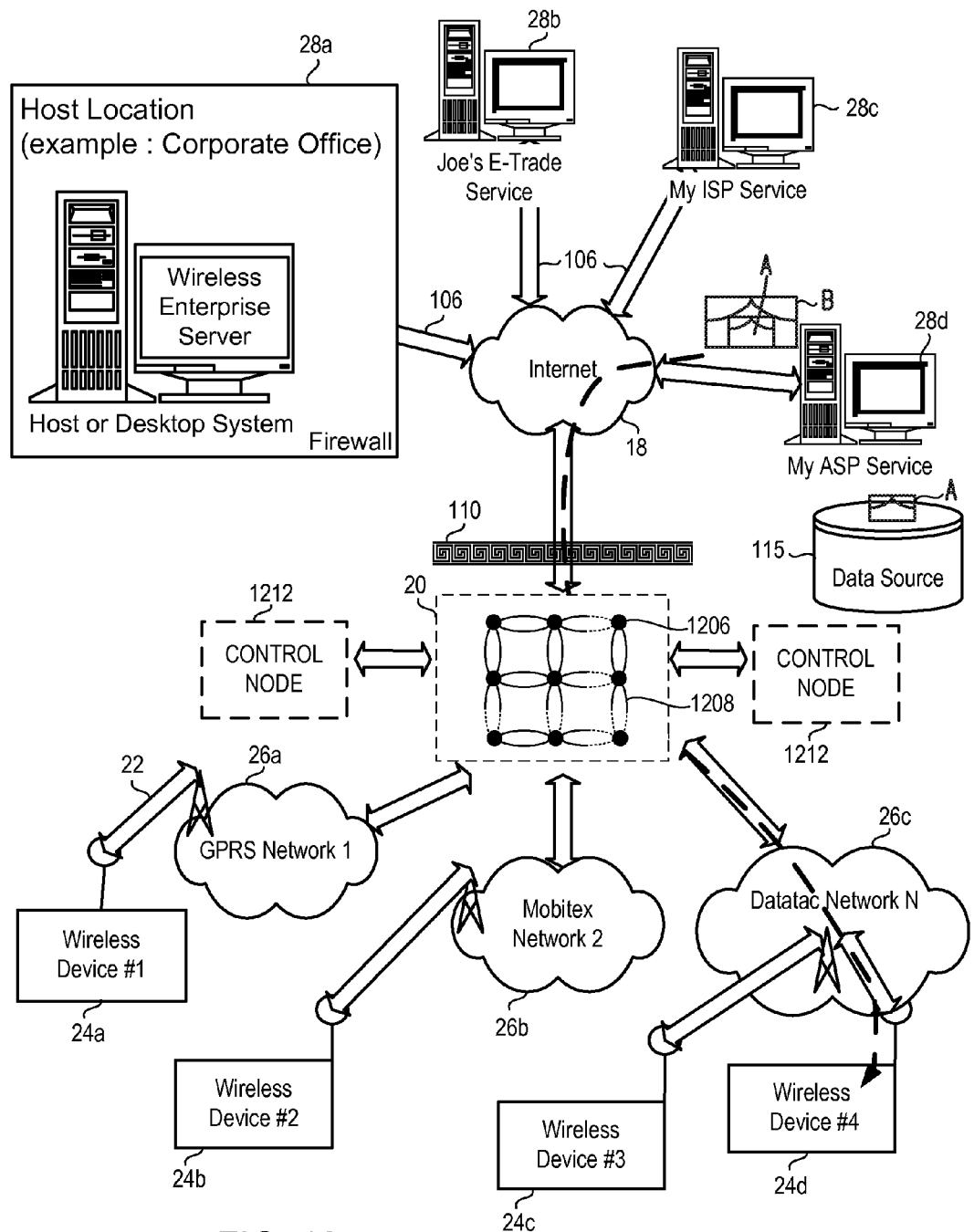
FIG. 12 is a system diagram, similar to that shown in FIG. 3, but here showing a mesh arrangement of wireless router of an alternate embodiment of the present invention.

FIG. 12 is a functional block diagram of an alternate, preferred embodiment of a routing system similar to that shown in FIG. 3. Elements shown in preceding figures are commonly-referenced, and the routing system again shows, e.g., the wireless enterprise server 28a and information services 28b, 28c and 28d. The server 28a and the services 28b, 28c and 28d are again shown to be connectable in communication connectivity with the WAN 18 by way of links 106. And, the service 28d, an ASP service, is again shown to be associated with a data source 115.

The routing system here also includes wireless devices 24a, 24b, 24c, and 24d. The wireless devices 24a, 24b, 24c, and 24d are again shown to be in communication connectivity with mobile networks 26a, 26b and 26c, respectively.

In this embodiment, the wireless router 20 is formed of a mesh arrangement. That is to say, a mesh is formed of an array of separate relays 1206. Each relay 1206 defines a node, separately connectable to a WAN 18, here by way of a firewall 110, and to the mobile networks 26. The nodes 1206 are interconnected, here by way of the lines 1208. The lines 1208 are, for instance, fiber cables capable of high-capacity bandwidth communications. The fiber cables are of capacities, for instance, to provide for communications pursuant to any of various data protocols, including, e.g., MPLS (Multipacket Layered Services).

In the exemplary embodiment shown in FIG. 12, the mesh arrangement is represented as an array of nodes, formed of m rows and n columns of wireless relays 1206. While, in the exemplary representation, only adjacent nodes are interconnected by the lines 1208, in other implementations, additional, or other, connections are provided. Two lines 1208 are shown to interconnect the interconnected nodes to represent duplex-capable communications between the interconnected nodes. In an alternate implementation, simplex communication connections are provided.

Each of the relays 1206 provides the functionality of the relay 20, shown in the embodiments of the previous figures. The mesh arrangement provides nodal redundancy. Through appropriate positioning of the nodes, failure of a node due to localized conditions, such as localized power failure permits the operations that are performed by one of the relays 1206 to be reallocated to another of the nodes 1206. Thereby, data communication operations that would otherwise be stalled, or otherwise uncompletable, are instead carried out by, or by way of, an alternate node. The communication lines 1208 extending to the mesh-configured relay 20 provide for connections to more than one of the nodes, thereby permitting rerouting of the data to the alternate node in the event that use of such substitute node is needed. The positioning of individual ones of the relays 1206 of the mesh arrangement are, for example, widely disparate. For example, positioning of different ones of the nodes in different continents, nations, or otherwise geographically-separated by large distances, reduces the possibility that a problem of even relatively large scope does not result in failure of communications.

FIG. 12 also illustrates a plurality of control nodes 1212 that are in communication connectivity with the nodes 1206. Here, for purposes of illustration, two disparately-positioned control nodes 1212 are represented. In other implementations, other numbers of control nodes are utilized. In one implementation, for instance, there is a one-to-one relationship of control nodes 1212 to wireless relays 1206. In other implementations, other numbers of control nodes are utilized. A control node 1212 includes the functionality, for instance, of the entities 300, 302, 304, 306, 308, 310, shown and described with respect to FIG. 4, as well as additional control functionality. And, the control node 1212 also includes data base and other, information, such as that represented by the entity 340 shown if FIG. 4.

The use of multiple control nodes 1212 provides control redundancy to permit continued control operations to be carried out therefrom in the event of interruption to operation, or failure, of a single control node. And, when more than two control nodes are utilized, multiple backup redundancy is provided. Again, in the exemplary implementation, the lines that interconnect a control node 1212 with a relay 1206 comprise, in the exemplary implementation, fiber-line connections. In other implementations, communication connectivity is provided in other manners, including wireless communication connections.

Figure 13:
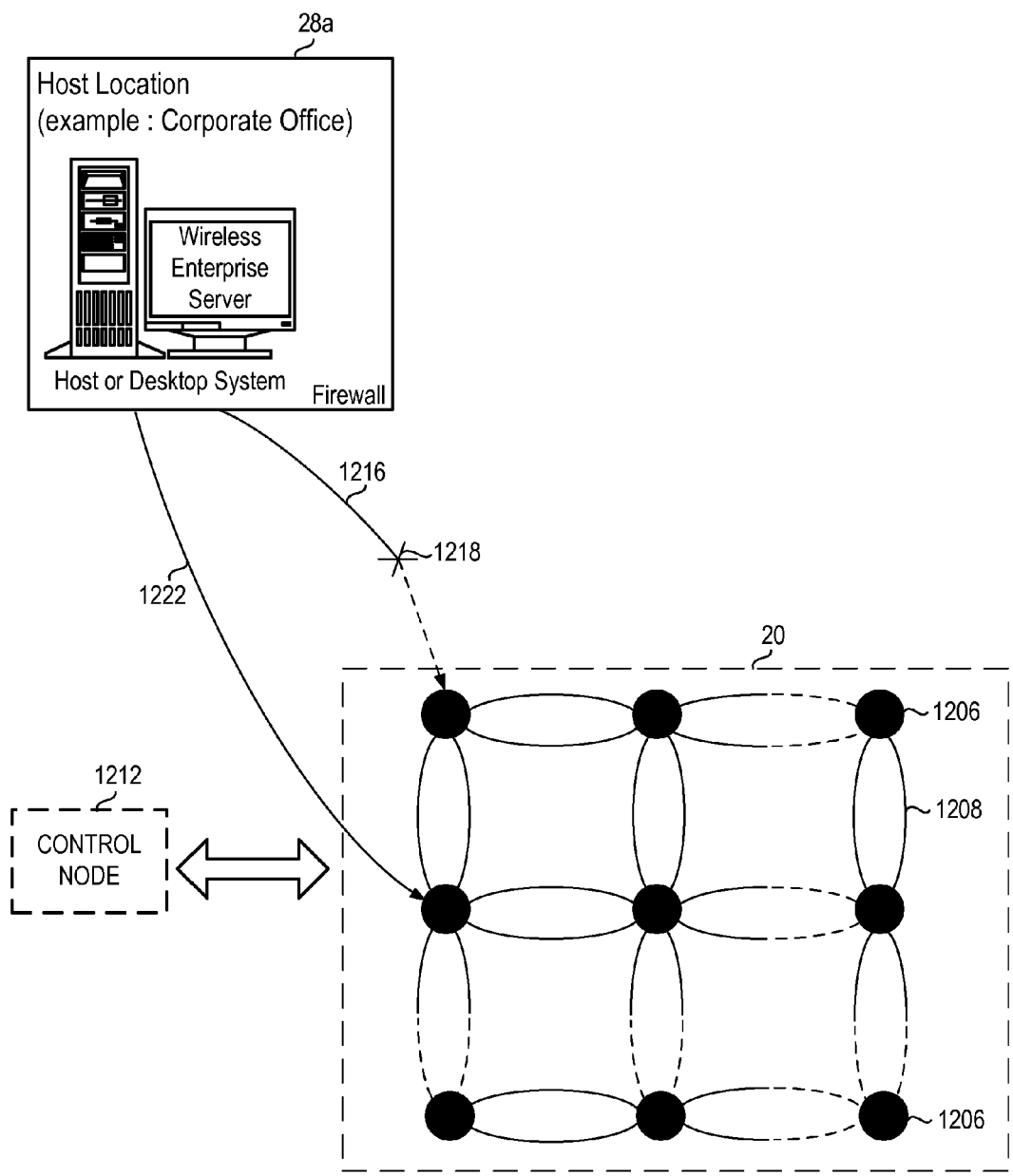
FIG. 13 is a representation of rerouting provided as a result of a multi-homing capability of a wireless enterprise server coupled to the mesh arrangement of wireless routers shown in FIG. 12 as a result of a node failure of a node of the mesh arrangement.

FIG. 13 again illustrates the wireless enterprise server 28a and the mesh-configured relay 20, formed of the multiple nodes 1206, that are interconnected by way of the lines 1208. FIG. 13 also shows one of the control nodes 1212, shown previously in FIG. 12.

FIG. 13 is illustrative of the advantages provided by the redundancy of a mesh arrangement of relays 1206. The line 1216 is representative of a communication path normally extending between the server 28a and a first node 1206. Here, though, the x-marking 1218 represents failure of communications with the first node, such as that which results from failure of the first node 1206. An illustrative example in which the failure occurs in the communication of data originated at a wireless device 24 is analogously represented. Due to the redundancy of the nodes, communications recommence using a second node 1206 with which a second communication path, here represented by the line 1222, is formable. Because the same functionality is provided by the second of the nodes 1206, communication interruption does not result in the event of communication failure with, or communication failure of, the first node 1206. Control operations continue to be provided by the control node 1212. In the event of failure of a control node 1212, such as when a control node 1212 is co-positioned with a failed node 1206, the redundancy provided by the multiple control nodes 1212 also facilitates continued communication operations.

Additionally, due to the interconnections between the relays 1206 of the mesh arrangement, during normal operation, i.e., prior to failure of any of the nodes, exchange of information, is possible. Such pre-failure exchange provides for back-up of information, all to facilitate continued communication operations in the event of subsequent failure of a node of the multiple-node implementation of wireless relays 1206.

Multi-homing capability of the wireless enterprise server is thereby provided. In the event of failure of a node 1206 to which the wireless enterprise server 28a initially homes, the access by the wireless enterprise server 28a to a substitute node, thereby providing multi-homing capability, permits continued communications to be carried out. The multi-homing capability is provided to the wireless enterprise server 28a through the provisioning of the wireless enterprise server 28a with the identity of one or more substitute nodes. The information includes, for instance, an address of the substitute node as well as routing information to permit routing of data thereto.

Thereby, a manner is provided by which to facilitate communication continuity in the event of failure of one or more relays 1206. A communication scheme of improved resilience is provided. Automated, or other, fail over capability is provided permitting continued communication operations, with little or no interruption, in the event of catastrophic failure of a node of the mesh-arranged collection of wireless relays.

What is claimed is:

1. A router system for routing data between a plurality of host services and a plurality of mobile devices, comprising:
   one or more host interfaces for communicating with the host services through a communication network, the host services being assigned host identifiers;
   a work dispatcher for making assignments between the host interfaces and the host services based on the host identifiers; and
   a plurality of relay nodes for routing data between the host services and the mobile devices in accordance with a destination of the data,
   the destination of the data corresponding to one of the host identifiers of the host service or a mobile identifier of one of the mobile devices to which the data is transmitted; and
   the host services being connected to at least two of the relay nodes via independent communication paths through the communication network, the independent communication paths extending between the host services and each of the at least two of the relay nodes.

2. The router system of claim 1, wherein:
   the router system is responsive to a communications failure between a host service and one of the at least two of the relay nodes connected to the host service and recommences communication between the host service and the router system using another one of the at least two of the relay nodes connected to the host service.

3. The router system of claim 1, wherein:
   the router system is responsive to a communications failure between a wireless network and a relay node and recommences communication between the wireless network and the router system using another of the plurality of relay nodes.

4. The router system of claim 1, wherein:
   the router system receives a data packet through one of the host interfaces, the data packet including a destination address indicating the destination of the data; and
   the relay nodes route the data packet through the router system based on the destination address.

5. The router system of claim 1 wherein:
   at least one of the plurality of relay nodes furnishes information regarding communication operations in which the at least one of the plurality of relay nodes is involved to at least one other of the plurality of relay nodes to facilitate continued communications in case of a failure involving the at least one of the plurality of relay nodes.

6. The router system of claim 1, further comprising:
   a registration and billing component for:
   at least one of registering or authenticating the plurality of mobile devices;
   tracking at least one of locations or statuses of the plurality of mobile devices; and
   determining a running tally of at least one of services or amounts of data exchanged between each host service and each mobile device.

7. The router system of claim 1, further comprising:
   a peer-to-peer messaging component for controlling the plurality of relay nodes to route data among the plurality of mobile devices.

8. The router system of claim 1, wherein:
   the plurality of relay nodes forms a mesh network within the router system.

9. The router system of claim 1, wherein:
   the plurality of relay nodes is disposed at a plurality of geographical locations.

10. The router system of claim 1, wherein:
    the host interface assigned to one of the plurality of host services authenticates and registers the host service and establishes a bi-directional communication channel through the plurality of relay nodes between the host service and one of the plurality of mobile devices.

11. A method for routing data between a plurality of services and a plurality of mobile devices, comprising:
    receiving data, by one of a plurality of interfaces from one of the plurality of services through a communication network, the data including a payload and a destination address corresponding to one of the plurality of mobile devices to which the data is transmitted;
    determining a mobile identifier based on the destination address;
    routing the data from the receiving interface in accordance with the destination address, the plurality of services being connected to at least two relay nodes via independent communication paths through the communication network, the independent communication paths extending between the services and each of the at least two of the relay nodes; and
    transmitting the data to one of the plurality of mobile devices, based on the mobile identifier, through at least one of a plurality of wireless networks.

12. The method of claim 11, further comprising:
    responsive to a communications failure between a service and a relay node connected to the service, recommencing communication using another relay node connected to the service.

13. The method of claim 11, further comprising:
    responsive to a communications failure between a wireless network and a relay node connected to the wireless network, recommencing communication using another relay node connected to the wireless network.

14. The method of claim 11, further comprising:
connecting the at least two relay nodes in a mesh network.

15. The method of claim 11, further comprising:
disposing the at least two relay nodes at differing geographical locations.

16. The method of claim 11, further comprising:
detecting a failure of a first one of the communication paths between a service and the at least two relay nodes; and
receiving the data from the service through a second one of the communication paths between the service and the at least two relay nodes.

17. The method of claim 11, further comprising:
detecting a failure of one of the at least two relay nodes; and
updating other relay nodes to reflect the failure of the relay node.

18. The method of claim 11, further comprising:
receiving data by one of the at least two relay nodes from one of the plurality of mobile devices through one of a plurality of wireless networks.

19. The method of claim 18, wherein:
the data including a payload and a service address corresponding to the one of the plurality of services.

20. The method of claim 19, further comprising:
routing the data to the receiving interface in accordance with the service address.

21. A router system for routing data between a plurality of host services and a plurality of mobile devices, comprising:
a mesh network including a plurality of interconnected relay nodes; and
a plurality of communication lines within the mesh network and interconnecting the relay nodes, wherein:
each of the relay nodes is connected to another of the relay nodes by way of the communication lines; and
wherein at least one of the plurality of host services is connected to at least two of the relay nodes via independent communication paths, the independent communication paths extending between the at least one of the plurality of host services and each of the at least two of the relay nodes.

22. The router system of claim 21, wherein:
the mesh network is in communication connectivity with an enterprise server that accesses the mesh network to communicate with the mobile devices; and
each communication line provides a path to at least two of the relay nodes.

23. The router system of claim 22, wherein:
the enterprise server communicates data on a normal path to a first relay node, and if the normal path is interrupted, then the enterprise server communicates the data on a substitute path.

24. The router system of claim 22, wherein:
the enterprise server communicates data on a normal path to a first relay node, and in case of a failure involving the first relay node, then the enterprise server communicates the data to a second relay node.

25. The router system of claim 21, wherein the communication lines comprise fiber-line connections.

26. The router system of claim 21, wherein the communication lines comprise wireless communication connections.

* * * * *